United States Patent
Fisher et al.

(10) Patent No.: US 10,274,914 B2
(45) Date of Patent: *Apr. 30, 2019

(54) SMART-HOME DEVICE THAT SELF-QUALIFIES FOR AWAY-STATE FUNCTIONALITY

(71) Applicant: Google LLC, Mountain View, CA (US)

(72) Inventors: Evan J. Fisher, Palo Alto, CA (US); Yoky Matsuoka, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/201,004

(22) Filed: Jul. 1, 2016

(65) Prior Publication Data
US 2016/0313022 A1    Oct. 27, 2016

Related U.S. Application Data

(63) Continuation of application No. 14/106,520, filed on Dec. 13, 2013, now Pat. No. 9,395,096, which is a
(Continued)

(51) Int. Cl.
*F24F 11/00* (2018.01)
*G05B 15/02* (2006.01)
(Continued)

(52) U.S. Cl.
CPC .............. *G05B 15/02* (2013.01); *F24F 11/30* (2018.01); *F24F 11/62* (2018.01); *G05B 11/01* (2013.01);
(Continued)

(58) Field of Classification Search
CPC ........ F24F 11/0034; F24F 11/30; F24F 11/62; F24F 11/64; F24F 2110/10;
(Continued)

(56) References Cited

U.S. PATENT DOCUMENTS

| 3,991,357 A | 11/1976 | Kaminski |
| 4,183,290 A | 1/1980 | Kucharczyk |

(Continued)

FOREIGN PATENT DOCUMENTS

| CA | 2202008 | 2/2000 |
| CN | 101253460 | 8/2008 |

(Continued)

OTHER PUBLICATIONS

Akhlaghinia, et al., Occupancy Monitoring in Intelligent Environment through Integrated Wireless Localizing Agents, IEEE, 2009, 7 pages.
(Continued)

*Primary Examiner* — Marc E Norman
(74) *Attorney, Agent, or Firm* — Kilpatrick Townsend & Stockton LLP

(57) ABSTRACT

A control unit for controlling the operation of at least one smart-home system may include at least one occupancy sensor and a processing system. The processing system may be configured to receive readings from the at least one occupancy sensor during a time interval; compare information derived from the readings to at least one threshold criterion to establish whether the one or more occupancy sensors reliably determined occupancy of an enclosure in which the control unit is installed during the time interval; and enable an away-state feature of the control unit if it is determined that the one or more occupancy sensors reliably determined occupancy of an enclosure during the time interval.

18 Claims, 15 Drawing Sheets

Related U.S. Application Data continuation of application No. 13/632,142, filed on Sep. 30, 2012, now Pat. No. 8,622,314, which is a continuation-in-part of application No. 13/279,151, filed on Oct. 21, 2011, now Pat. No. 8,950,686.

(60) Provisional application No. 61/550,345, filed on Oct. 21, 2011, provisional application No. 61/627,996, filed on Oct. 21, 2011.

(51) Int. Cl.
| | |
|---|---|
| *G05D 23/19* | (2006.01) |
| *G05B 11/01* | (2006.01) |
| *G05B 19/042* | (2006.01) |
| *F24F 11/30* | (2018.01) |
| *F24F 11/62* | (2018.01) |
| *F24F 110/10* | (2018.01) |
| *F24F 120/10* | (2018.01) |
| *F24F 120/12* | (2018.01) |
| *F24F 140/60* | (2018.01) |
| *F24F 11/64* | (2018.01) |
| *F24F 11/46* | (2018.01) |

(52) U.S. Cl.
CPC ....... *G05B 19/042* (2013.01); *G05D 23/1904* (2013.01); *F24F 11/46* (2018.01); *F24F 11/64* (2018.01); *F24F 2110/10* (2018.01); *F24F 2120/10* (2018.01); *F24F 2120/12* (2018.01); *F24F 2140/60* (2018.01)

(58) Field of Classification Search
CPC ............... F24F 2120/10; F24F 2120/12; F24F 2120/14; F24F 2140/60; G05B 11/01; G05B 15/02; G05B 19/042; G05D 13/1904; G05D 23/1904
See application file for complete search history.

(56) References Cited

U.S. PATENT DOCUMENTS

| | | |
|---|---|---|
| 4,223,831 A | 9/1980 | Szarka |
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,897,798 A | 1/1990 | Cler |
| 4,971,136 A | 11/1990 | Mathur et al. |
| 5,088,645 A | 2/1992 | Bell |
| 5,165,465 A | 11/1992 | Kenet |
| 5,211,332 A | 5/1993 | Adams |
| 5,240,178 A | 8/1993 | Dewolf et al. |
| 5,244,146 A | 9/1993 | Jefferson et al. |
| 5,261,481 A | 11/1993 | Baldwin et al. |
| 5,395,042 A | 3/1995 | Riley et al. |
| 5,476,221 A | 12/1995 | Seymour |
| 5,499,196 A | 3/1996 | Pacheco |
| 5,555,927 A | 9/1996 | Shah |
| 5,611,484 A | 3/1997 | Uhrich |
| 5,808,294 A | 9/1998 | Neumann |
| 5,902,183 A | 5/1999 | D'Souza |
| 5,909,378 A | 6/1999 | De Milleville |
| 5,918,474 A | 7/1999 | Khanpara et al. |
| 5,977,964 A | 11/1999 | Williams et al. |
| 6,062,482 A | 5/2000 | Gauthier et al. |
| 6,066,843 A | 5/2000 | Scheremeta |
| 6,072,784 A | 6/2000 | Agrawal et al. |
| 6,095,427 A | 8/2000 | Hoium et al. |
| 6,098,893 A | 8/2000 | Berglund et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,453,687 B2 | 9/2002 | Sharood et al. |
| 6,478,233 B1 | 11/2002 | Shah |
| 6,619,055 B1 | 9/2003 | Addy |
| 6,645,066 B2 | 11/2003 | Gutta et al. |
| 6,769,482 B2 | 8/2004 | Wagner et al. |
| 6,860,288 B2 | 3/2005 | Uhler |
| 6,891,838 B1 | 5/2005 | Petite et al. |
| 6,909,921 B1 | 6/2005 | Bilger |
| 6,990,821 B2 | 1/2006 | Singh et al. |
| 7,024,336 B2 | 4/2006 | Salsbury et al. |
| 7,135,965 B2 | 11/2006 | Chapman, Jr. et al. |
| 7,149,727 B1 | 12/2006 | Nicholls et al. |
| 7,149,729 B2 | 12/2006 | Kaasten et al. |
| 7,188,482 B2 | 3/2007 | Sadegh et al. |
| 7,379,791 B2 | 5/2008 | Tamarkin et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,837,958 B2 | 11/2010 | Crapser et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 8,010,237 B2 | 8/2011 | Cheung et al. |
| 8,019,567 B2 | 9/2011 | Steinberg et al. |
| 8,020,777 B2 | 9/2011 | Kates |
| 8,037,022 B2 | 10/2011 | Rahman et al. |
| 8,090,477 B1 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,219,249 B2 | 7/2012 | Harrod et al. |
| 8,622,314 B2* | 1/2014 | Fisher ............... F24F 11/0034 236/46 C |
| 9,189,751 B2* | 11/2015 | Matsuoka ........... H04L 12/2829 |
| 9,233,472 B2* | 1/2016 | Angle ................. H04L 12/282 |
| 9,395,096 B2* | 7/2016 | Fisher ................. F24F 11/0034 |
| 2004/0249479 A1 | 12/2004 | Shorrock |
| 2004/0262410 A1 | 12/2004 | Hull |
| 2005/0090915 A1 | 4/2005 | Geuwutz |
| 2005/0125083 A1 | 6/2005 | Kiko |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0246408 A1 | 11/2005 | Chung |
| 2005/0270151 A1 | 12/2005 | Winick |
| 2005/0280421 A1 | 12/2005 | Yomoda et al. |
| 2006/0186214 A1 | 8/2006 | Simon et al. |
| 2006/0192021 A1 | 8/2006 | Schulz et al. |
| 2006/0196953 A1 | 9/2006 | Simon et al. |
| 2006/0208099 A1 | 9/2006 | Chapman et al. |
| 2007/0038787 A1 | 2/2007 | Harris et al. |
| 2007/0045431 A1 | 3/2007 | Chapman et al. |
| 2007/0115902 A1 | 5/2007 | Shamoon et al. |
| 2007/0205297 A1 | 9/2007 | Finkam et al. |
| 2007/0241203 A1 | 10/2007 | Wagner et al. |
| 2008/0015742 A1 | 1/2008 | Kulyk et al. |
| 2008/0183335 A1 | 7/2008 | Poth et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0065595 A1 | 3/2009 | Kates |
| 2009/0099699 A1 | 4/2009 | Steinberg et al. |
| 2009/0140061 A1 | 7/2009 | Schulz et al. |
| 2009/0171862 A1 | 7/2009 | Harrod et al. |
| 2009/0254225 A1 | 10/2009 | Boucher et al. |
| 2009/0259713 A1 | 10/2009 | Blumrich et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton et al. |
| 2010/0070084 A1 | 3/2010 | Steinberg et al. |

(56) References Cited

U.S. PATENT DOCUMENTS

| | | |
|---|---|---|
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0107112 A1 | 4/2010 | Jennings et al. |
| 2010/0156608 A1 | 6/2010 | Bae et al. |
| 2010/0167783 A1 | 7/2010 | Alameh et al. |
| 2010/0179704 A1 | 7/2010 | Ozog |
| 2010/0207759 A1 | 8/2010 | Sloan et al. |
| 2010/0211224 A1 | 8/2010 | Keeling et al. |
| 2010/0243231 A1 | 9/2010 | Rosen |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0006887 A1 | 1/2011 | Shaull et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077758 A1 | 3/2011 | Tran et al. |
| 2011/0077896 A1 | 3/2011 | Steinberg et al. |
| 2011/0151837 A1 | 6/2011 | Winbush |
| 2011/0160913 A1 | 6/2011 | Parker et al. |
| 2011/0185895 A1 | 8/2011 | Freen |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0066167 A1 | 3/2012 | Fokoue et al. |
| 2012/0085831 A1 | 4/2012 | Kopp |
| 2012/0101637 A1 | 4/2012 | Imes et al. |
| 2012/0158350 A1 | 6/2012 | Steinberg et al. |
| 2012/0221151 A1 | 8/2012 | Steinberg |
| 2012/0252430 A1 | 10/2012 | Imes et al. |
| 2012/0318490 A1 | 12/2012 | Kopp |
| 2013/0098596 A1 | 4/2013 | Fisher et al. |
| 2015/0142180 A1 | 5/2015 | Matsuoka et al. |

FOREIGN PATENT DOCUMENTS

| | | |
|---|---|---|
| CN | 101681460 A | 3/2010 |
| EP | 196069 | 12/1991 |
| EP | 196069 B1 | 12/1991 |
| EP | 1398742 A1 | 3/2004 |
| EP | 2641140 | 9/2013 |
| EP | 2769277 | 8/2014 |
| JP | 01-252850 A | 6/1984 |
| JP | 59106311 | 6/1984 |
| JP | 1252850 | 10/1989 |
| JP | H02-12508 | 1/1990 |
| JP | 9298780 | 11/1997 |
| JP | 20140507018 | 3/2014 |
| JP | 2015/500974 A | 1/2015 |
| JP | 5731076 | 4/2015 |
| WO | 2010116283 A2 | 10/2010 |
| WO | 2012068495 | 5/2012 |
| WO | 2013/058969 | 4/2013 |

OTHER PUBLICATIONS

Akhlaghinia, et al., Occupant Behaviour Predication in Ambient Intelligence Computing Environment, Journal of Uncertain Systems, vol. 2, No. 2, 2008, pp. 85-100.

Allen, et al., Real-Time Earthquake Detection and Hazard Assessment by ElarmS Across California, Geophysical Research Letters, vol. 36, L00B08, 2009, pp. 1-6.

Aprilaire Electronic Thermostats Model 8355 User's Manual, Research Products Corporation, Dec. 2000, 16 pages.

Bnraeburn Model 5200, Braeburn Systems, LLC, Jul. 20, 2011, 11 pages.

Braeburn 5300 Installer Guide, Braeburn Systems, LLC, Dec. 9, 2009, 10 pages.

Chatzigiannakis, et al., Priority Based Adaptive Coordination of Wireless Sensors and Actors, Q2SWinet '06, Oct. 2006, pp. 37-44.

Chinese Office Action dated Aug. 27, 2015, for Chinese Patent Application No. 201280051997.2 filed Sep. 30, 2012, all pages.

Chinese Office Action dated Jan. 30, 2015, for Chinese Patent Application No. 201280051997.2 filed Sep. 30, 2012, all pages.

Chinese Office Action dated Mar. 27, 2015, for Chinese Patent Application No. 201280051827.4 filed Sep. 30, 2012, all pages.

Chinese Office Action dated Nov. 24, 2014, for Chinese Patent Application No. 201180055866.7 filed Nov. 18, 2011, all pages.

Chinese Office Action dated Sep. 29, 2015, for Chinese Patent Application No. 201280051827.4 filed Sep. 30, 2012, all pages.

Deleeuw, Ecobee WiFi Enabled Smart Thermostat Part 2: The Features Review, retrieved from the Internet: <URL: http://www.homenetworkenabled.com/content/php?136-ecobee-WiFi-enabled-Smart-Thermostat-Part-2-The-Features-review> [retrieved on Jan. 8, 2013], Dec. 2, 2011, 5 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Gao, et al., The Self-Programming Thermostat: Optimizing Setback Schedules Based on Home Occupancy Patterns, In Proceedings of the Firms ACM Workshop on Embedded Sensing Systems for Energy Efficiency in Buildings, Nov. 3, 2009, 6 pages.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige IAQ Product Data 2, Honeywell International, Inc., Jan. 12, 2012, 126 pages.

Honeywell Prestige THX9321 and THX9421 Product Data, Honeywell International, Inc., 68-0311, Jan. 2012, 120 pages.

Honeywell Prestige THX9321-9421 Operating Manual, Honeywell International Inc., Jul. 6, 2011, 120 pages.

Hunter Internet Thermostat Installation Guide, Hunter Fan Co. Aug. 14, 2012, 8 pages.

International Application No. PCT/US2012/058206, International Preliminary Report on Patentability dated May 1, 2014, 8 pages.

International Application No. PCT/US2012/058206, International Search Report and Written Opinion dated Dec. 27, 2012, 13 pages.

International Preliminary Report on Patentability dated May 21, 2013, for International Patent Application No. PCT/US2011/061457 filed Nov. 18, 2011, 9 pages.

International Search Report and Written Opinion dated Mar. 30, 2012, for International Patent Application No. PCT/US2011/061457 filed Nov. 18, 2011, 10 pages.

Introducing the New Smart Si Thermostat, Datasheet [online], retrieved from the internet: <URL:https://www.ecobee.com/solutions/home/smart-si/> [retrieved on Feb. 25, 2013], Ecobee, Mar. 12, 2012, 4 pages.

Japanese Notice of Allowance dated Mar. 9, 2015, for Japanese Patent Application No. 2014-537088 filed Sep. 30, 2012, all pages.

Japanese Office Action dated Nov. 17, 2014, for Japanese Patent Application No. 2014-537088 filed Sep. 30, 2012, all pages.

Japanese Office Action dated Oct. 30, 2014, for Japanese Patent Application No. 2014-537087, filed Apr. 21, 2014, all pages.

Japanese Office Action dated Feb. 15, 2016, for Japanese Patent Application No. 2015/029330, 7 pages. English Translation.

Lennox ComfortSense 5000 Owners Guide, Lennox Industries, Inc., Feb. 2008, 32 pages.

Lennox ComfortSense 7000 Owners Guide, Lennox Industries, Inc., May 2009, 15 pages.

Lennox iComfort Manual, Lennox Industries Inc., Dec. 2010, 20 pages.

Loisos, et al., Buildings End-Use Energy Efficiency: Alternatives to Compressor Cooling, California Energy Commission, Public Interest Energy Research Jan. 20000, 80 pages.

(56) References Cited

OTHER PUBLICATIONS

Lu, et al., The Smart Thermostat: Using Occupancy Sensors to Save Energy in Homes, In Proceedings of the 8th ACM Conference on Embedded Networked Sensor Systems, Nov. 305, 2010, pp. 211-224.
Lux PSPU732T Manual, Lux Products Corporation, Jan. 6, 2009, 48 pages.
Mozer, et al., The Neurothermostat, Predictive Optimal Control of Residential Heating Systems, appearing in M. Mozer et al., Adv. In Neural Info. Proc. Systems 9, Cambridge, MA: MIT Press. 1997, 19997, pp. 953-959.
NetX RP-32 WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2 Maple Chase Company, Jul. 17, 2006, 36 pages.
Ros, et al., Multi-Sensor Human Tracking with the Bayesian Occupancy Filter, IEEE, 2009, 8 pages.
Supplementary European Search Report completed Dec. 1, 2014, for European Patent Application No. EP12841936 filed Sep. 30, 2012, all pages.
Supplementary European Search Report completed Jan. 14, 2015, for European Patent Application No. EP12841861 filed Apr. 23, 2014, 1 page.
SYSTXCCUIZ01-V Infinity Control Installation Instructions, Carrier Corp., May 31, 2012, 20 pages.
T8611G Chronotherm IV Deluxe Programmable Heat Pump Thermostat Product Data, Honeywell International Inc., Oct. 1997, 24 pages.
TB-PAC, TP-PHP, Base Series Programmable Thermostats, Carrier Corp., May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp., Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
U.S. Appl. No. 13/632, 1424, Notice of Allowance dated Sep. 30, 2013, 6 pages.
U.S. Appl. No. 13/632,142, Notice of Allowance dated Feb. 25, 2013, 10 pages.
U.S. Appl. No. 13/632,142, Notice of Allowance dated May 29, 2013, 6 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 2010, 8 pages.
White Rodgers (Emerson) Model 1F81-261 Installation and Operating Instructions, White Rodgers, Jan. 25, 2012, 28 pages.
Wong, et al., Maximum Likelihood Estimation of ARMA Model with Error Processes for Replicated Observations, National University of Singapore, Department of Economics, Working Paper No. 0217, Feb. 2002, pp. 1-19.
EU Patent Application No. 16174943.7 filed Sep. 30, 2012, Extended European Search Report dated Nov. 16, 2016, all pages.
CN Patent Application No. 201610515219.4 filed Sep. 30, 2012, CN/EP Office Action dated Sep. 6, 2017, all pages.
Office action dated Jul. 26, 2018 in related Canadian application No. 2,853,046, all pages.

* cited by examiner

SMART-HOME DEVICE THAT SELF-QUALIFIES FOR AWAY-STATE FUNCTIONALITY

CROSS-REFERENCES TO RELATED APPLICATIONS

This application is a continuation of U.S. Ser. No. 14/106,520 filed Dec. 13, 2013, which is incorporated herein by reference. U.S. Ser. No. 14/106,520 is a continuation of U.S. Ser. No. 13/632,142 filed Sep. 30, 2012, which is incorporated herein by reference. U.S. Ser. No. 13/632,142 is a continuation-in-part of U.S. Ser. No. 13/279,151 filed Oct. 21, 2011, which is incorporated herein by reference. U.S. Ser. No. 13/632,142 claims the benefit of U.S. Provisional Application No. 61/550,345 filed Oct. 21, 2011, which is incorporated herein by reference. U.S. Ser. No. 13/632,142 claims the benefit of U.S. Provisional Application No. 61/627,996 filed Oct. 21, 2011, which is incorporated herein by reference.

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for activating electronic displays for thermostats that govern the operation of heating, ventilation, and air conditioning (HVAC) systems.

BACKGROUND OF THE INVENTION

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Programmable thermostats have become more prevalent in recent years in view of Energy Star (US) and TCO (Europe) standards, and which have progressed considerably in the number of different settings for an HVAC system that can be individually manipulated. Some programmable thermostats have standard default programs built in. Additionally, users are able to adjust the manufacturer defaults to optimize their own energy usage. Ideally, a schedule is used that accurately reflects the usual behavior of the occupants in terms of sleeping, waking and periods of non-occupancy. Due to difficulty in programming many thermostats, however, may schedules do not accurately reflect the usual behavior of the occupants. For example, the schedule may not account for some usual periods of non-occupancy. Additionally, even when a suitable schedule is programmed into the thermostat, inevitably there are departures from usual behavior. The user can manually set back the thermostat when leaving the house and then resume the schedule upon returning, but many users never or very seldom perform these tasks. Thus an opportunity for energy and cost savings exist if a thermostat can automatically set back the setpoint temperature during time of non-occupancy.

U.S. Patent Application Publication No. 2010/0019051 A1 discusses overriding of nonoccupancy status in a thermostat device based upon analysis or recent patterns of occupancy. The publication discusses a "safety time," for example during the nighttime hours in a hotel or motel room, during which requirements to maintain a condition of occupancy are relaxed based on pattern recognition analysis. A "hysteresis" period of typically less than a few minutes can be built into the motion sensor to establish occupancy for some period after any motion is detected or signaled. An increased hysteresis period can be used during safety times such as during the evening and night hours. The focus is mainly on reliably detecting when occupants return from an absence.

Important issues arise, however, at the interface between (i) energy-saving technologies that might be achievable using known sensing and processing methods, and (ii) the actual widespread user adoption of devices that implement such energy-saving technologies and the integration of those devices into their daily routines and environment. It has been found especially important that the "first contact" between a user and an energy-saving device, and the first couple of days/weeks of the user experience with that energy-saving device, constitute a particularly easy, enjoyable, and pleasant experience, or else the user can quickly "turn off" or "tune out" to the device and its energy-saving advantages, such as by de-activating the advanced features (for example, setting their thermostat to a "temporary" manual-override mode on a permanent basis) or even taking it back to the seller and replacing it with their old device or a "less complicated" device. More bluntly stated, the roadways of green technology are littered with the skulls of devices and systems that promised to save energy but that no homeowners wanted to use. One or more issues arises in the context of providing an intelligent, multi-sensing, network-connected, energy-saving device for adoption into the home in an easy, pleasant, and user-friendly manner that is at least partially addressed by one or more of the embodiments described further hereinbelow. Other issues arise as would be apparent to a person skilled in the art in view of the present teachings.

BRIEF SUMMARY OF THE INVENTION

In one embodiment, a thermostat may be presented. The thermostat may include a housing and a processing system disposed within the housing. The processing may be coupled to a user interface and configured to be in operative communication with one or more temperature sensors for determining an ambient air temperature. The processing system may also be in operative communication with one or more input devices, including the user interface, for determining a setpoint temperature value. The processing system may be in still further operative communication with a heating, ventilation, and air conditioning (HVAC) system to control the HVAC system based at least in part on a comparison of a measured ambient temperature and the setpoint temperature value.

The thermostat may also include at least one occupancy sensor in operative communication with the processing system. The thermostat may include an away-state feature in which the thermostat enters into an away-state mode of operation upon a determination by the processing system based on readings acquired by the at least one occupancy sensor that an away-state criterion indicative of a non-occupancy condition for an enclosure in which the thermostat has been installed has been satisfied, where the away-state mode of operation can include an automated setpoint temperature setback mode.

In one embodiment, the processing system can be further configured to automatically determine, without requiring user input, whether to activate the away-state feature for the enclosure in which the thermostat has been installed. This may include receiving readings from the at least one occupancy sensor during a trial period; comparing information derived from the trial period readings to a threshold criterion to establish whether sufficiently true indications of occupancy conditions were sensed by the at least one occupancy sensor during the trial period; and enabling the away-state feature of the thermostat only if it is determined that the sufficiently true indications of occupancy conditions were sensed during the trial period.

In another embodiment, a method of qualifying a thermostat to activate an away-state feature may be presented. The method may include receiving readings from at least one occupancy sensor during a trial period, where the at least one occupancy sensor can be in operative communication with a processing system. In one embodiment, the processing system is disposed within a thermostat housing and coupled to a user interface, the processing system being configured to be in operative communication with one or more temperature sensors for determining an ambient air temperature, in operative communication with one or more input devices including the user interface for determining a setpoint temperature value, and in still further operative communication with a heating, ventilation, and air conditioning (HVAC) system to control the HVAC system based at least in part on a comparison of a measured ambient temperature and the setpoint temperature value.

The method may also include comparing information derived from the trial period readings to threshold criterion to establish whether sufficiently true indications of occupancy conditions were sensed by the at least one occupancy sensor during the trial period. The method may additionally include determining automatically, without requiring user input, whether to activate the away-state feature for an enclosure in which the thermostat has been installed. In one embodiment, the away-state feature causes the thermostat to enter into an away-state mode of operation upon a determination by the processing system based on the readings acquired by the at least one occupancy sensor that an away-state criterion indicative of a non-occupancy condition for the enclosure in which the thermostat has been installed has been satisfied, where the away-state mode of operation may include an automated setpoint temperature setback mode. The method may further include enabling the away-state feature of the thermostat only if it is determined that the sufficiently true indications of occupancy conditions were sensed during the trial period.

In yet another embodiment, another thermostat may be presented. The thermostat may include a housing and an occupancy sensor that is disposed within the housing and configured to detect physical presences of users within a responsive area of the occupancy sensor. The thermostat may also include a processing system that is disposed within the housing and in operative communication with the occupancy sensor, the processing system being configured to determine after a trial period whether to activate an away-state feature. This determination may include storing indications of how often the occupancy sensor detected physical presences of users during the trial period; computing an occupancy level for the trial period based on the stored indications; comparing the occupancy level to a threshold criterion; determining whether sufficiently true indications of occupancy conditions were sensed by the occupancy sensor during the trial period based on the comparison; and enabling the away-state feature of the thermostat only if it is determined that the sufficiently true indications of occupancy conditions were sensed during the trial period.

A further understanding of the nature and advantages of the present invention may be realized by reference to the remaining portions of the specification and the drawings. Also note that other embodiments may be described in the following disclosure and claims.

DETAILED DESCRIPTION OF THE INVENTION

Figure 1:
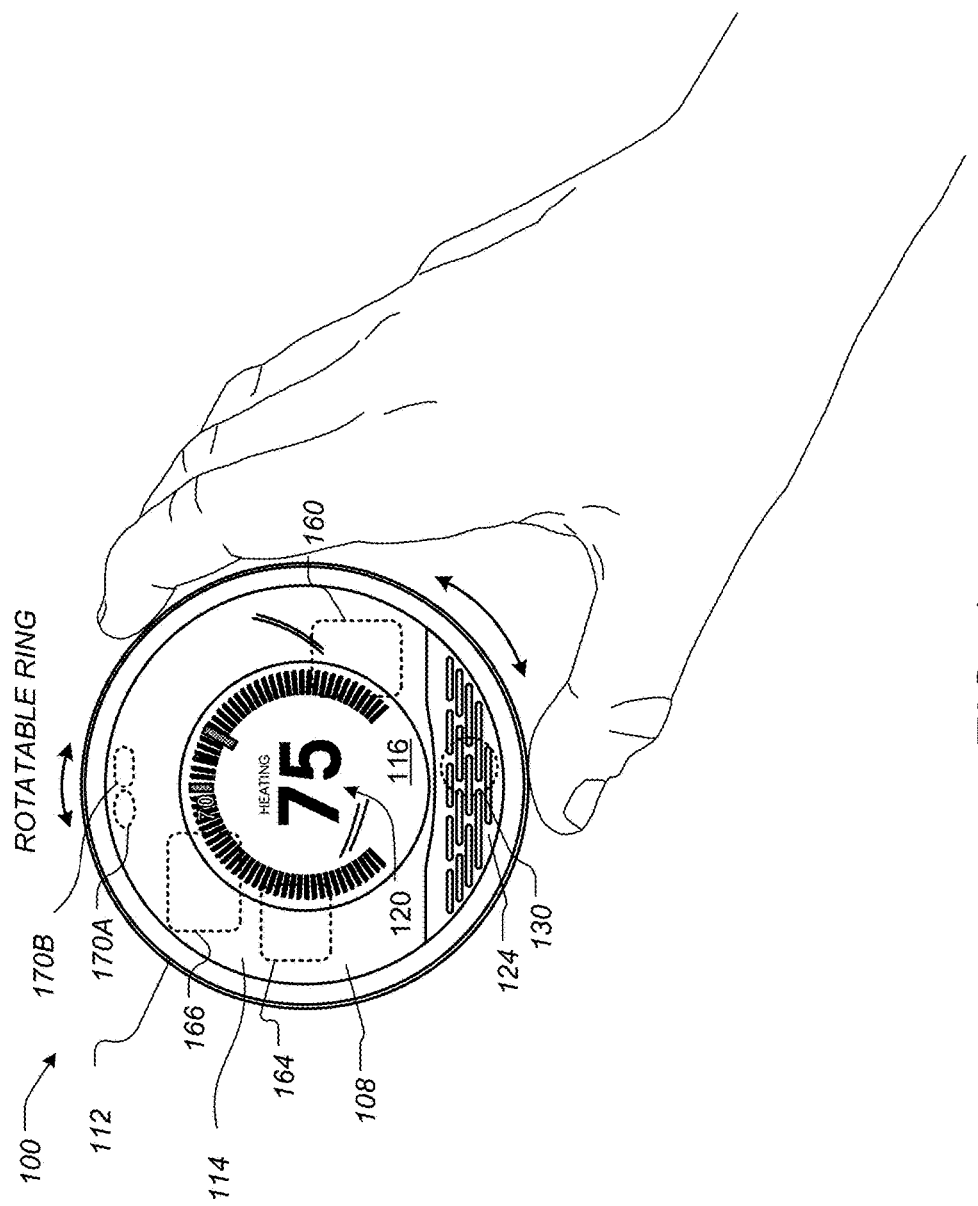
FIG. 1 illustrates a perspective view of a thermostat, according to one embodiment.

The subject matter of this patent specification further relates to the subject matter of the following commonly assigned applications, each of which is incorporated by reference herein: U.S. Ser. No. 13/269,501 filed Oct. 7, 2011; International Application PCT/US12/00007 filed Jan. 3, 2012; U.S. Ser. No. 13/632,070 filed even date herewith and entitled, "Automated Presence Detection and Presence-Related Control Within An Intelligent Controller;" and U.S. Ser. No. 13/632,112 filed even date herewith and entitled, "Adjusting Proximity Thresholds for Activating a Device User Interface." The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Exemplary Thermostat Embodiments

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. A VSCU may also be referred to herein simply as a "control unit." The term "thermostat" is used herein below to represent a particular type of control unit that is particularly applicable for HVAC control in an enclosure. Although "thermostat" and "control unit" may be seen as generally interchangeable for the contexts of HVAC control of an enclosure, it is within the scope of the present teachings for each of the embodiments herein to be applied to control units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of a sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy, as is described further in the commonly assigned U.S. Ser. No. 12/881,430, supra. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
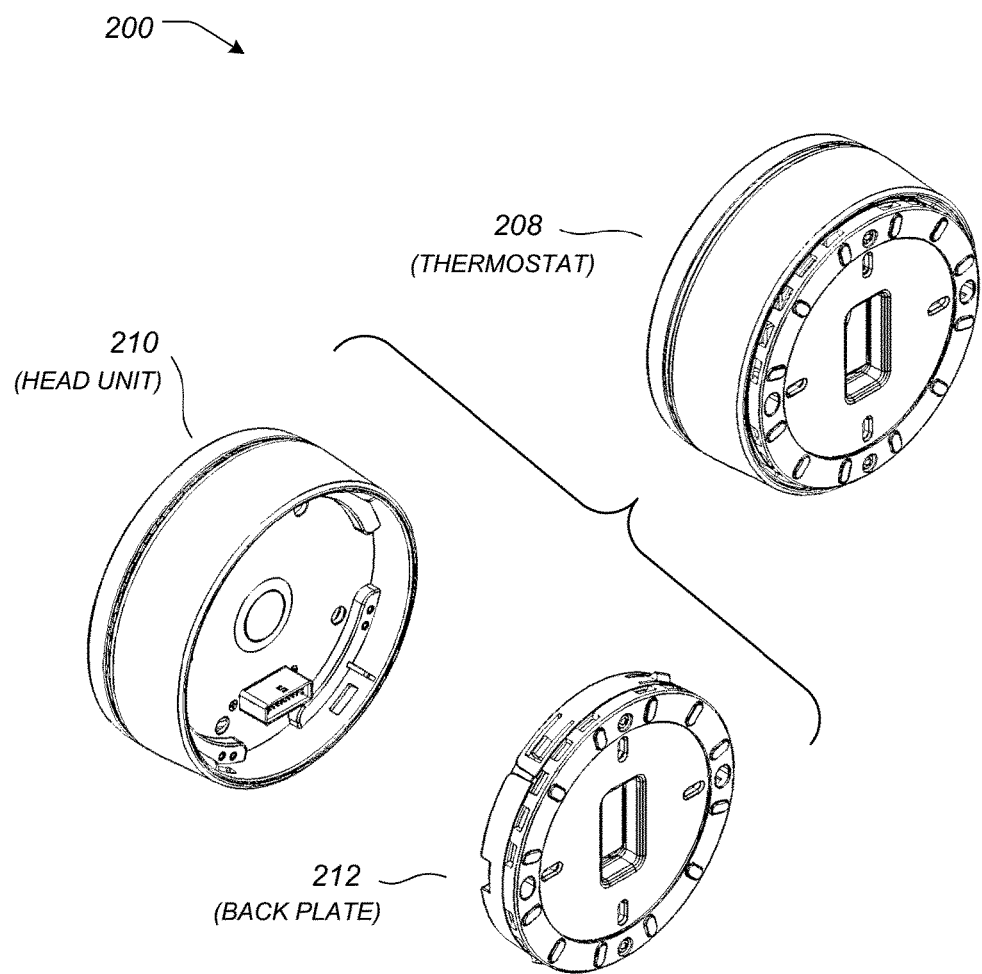
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
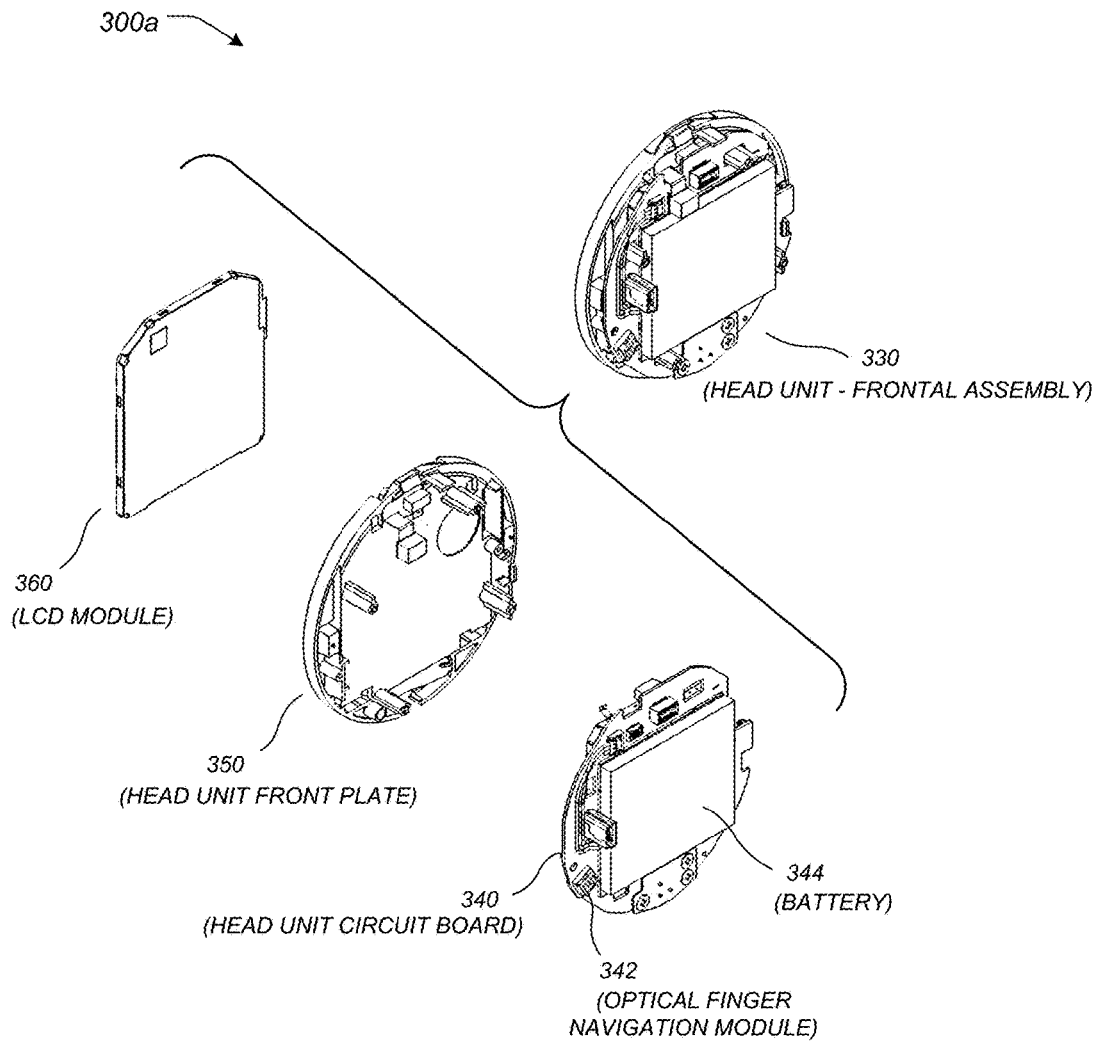
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
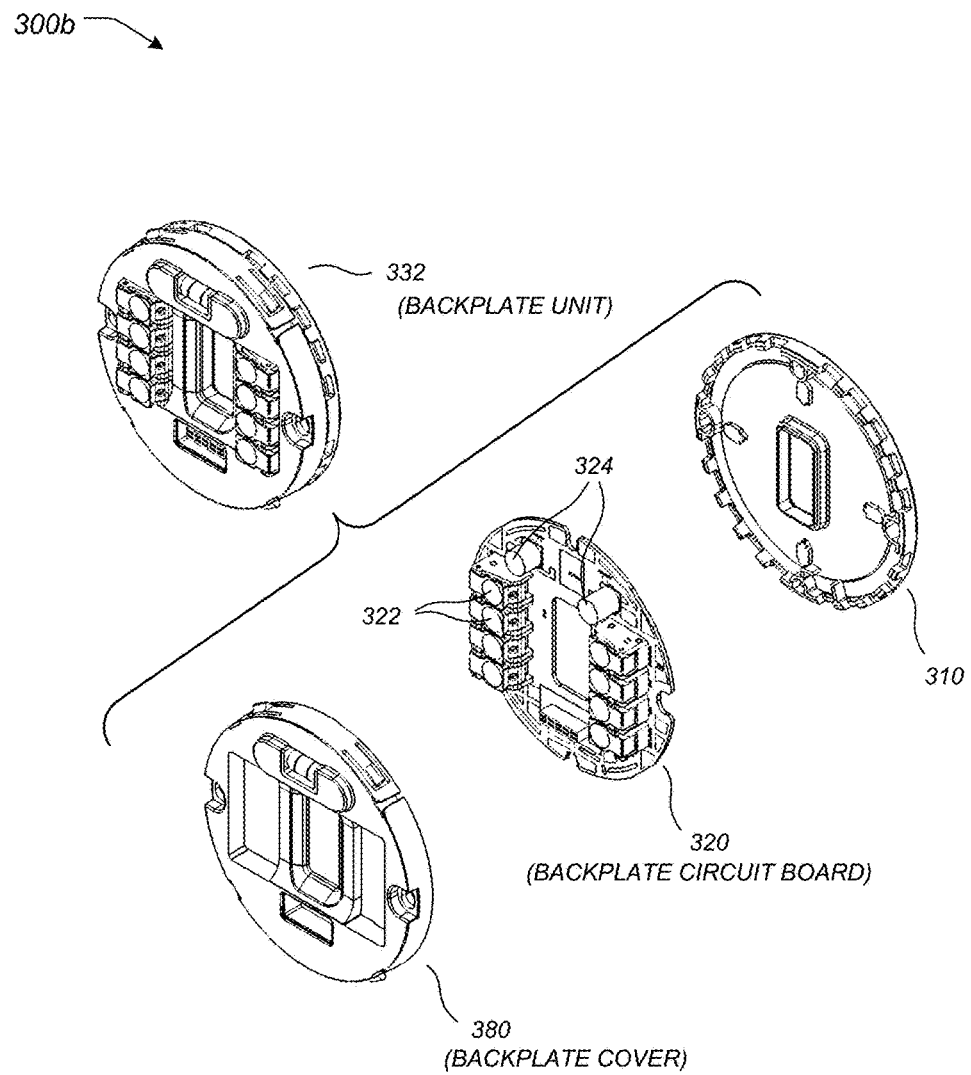
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
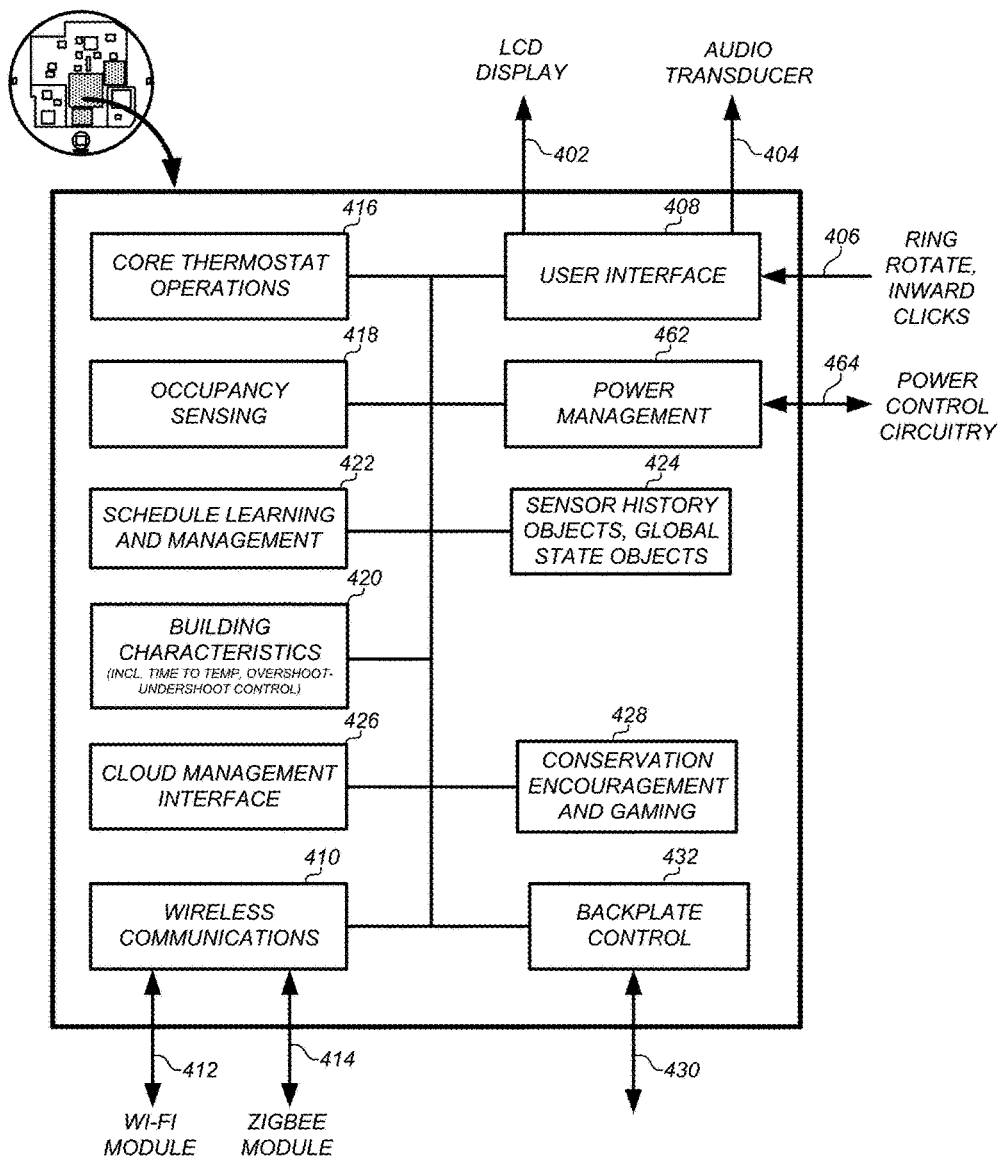
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
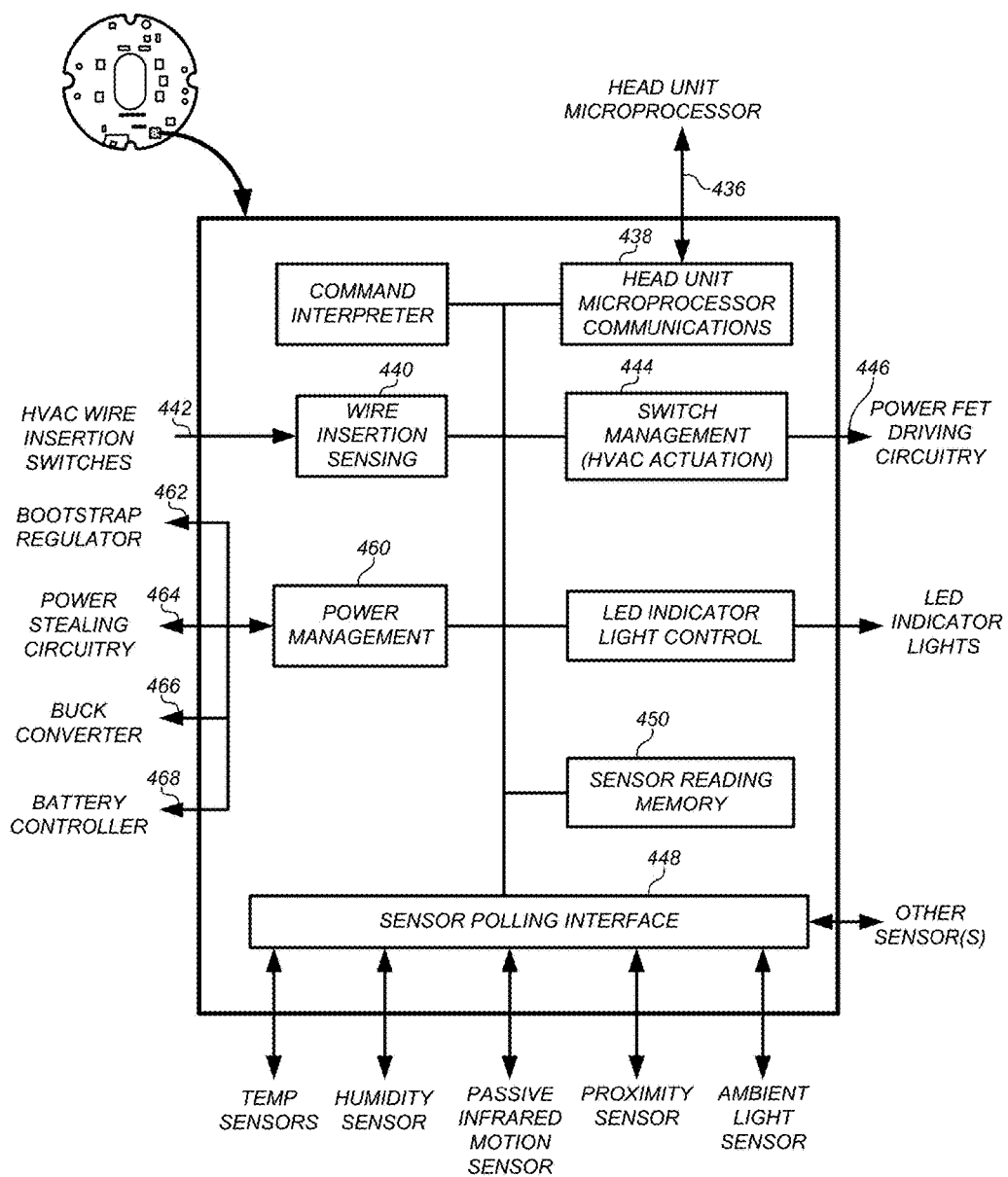
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states. The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
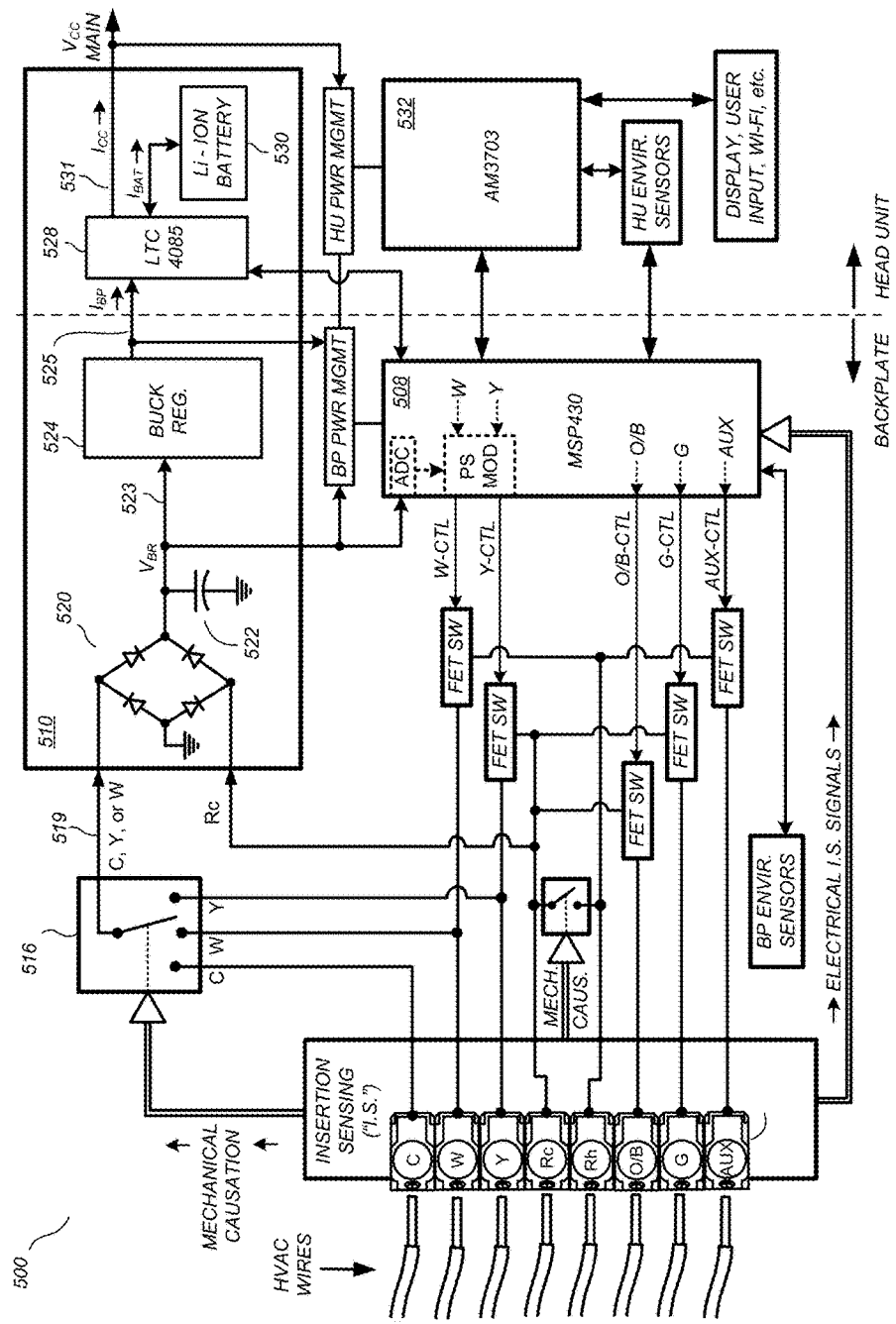
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below. Description of further details of the powering circuitry 510 and associated components can be found elsewhere in the instant disclosure and/or in the commonly assigned U.S. Ser. No. 13/034,678, supra, and U.S. Ser. No. 13/267,871, supra.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Enabling an Away-State Feature

In modern network-enabled homes, many different types of devices can be used to control various aspects of the homes environment, including air temperature, humidity, fan speed, music, television, appliances, and/or the like. Many embodiments of the present invention enable these devices to be configured to operate in one mode when the home is occupied and to operate in a second mode when the home is unoccupied. For example, when the home is occupied, devices can be configured to activate user interfaces, maintain certain levels of temperature and/or humidity, provide predetermined volume levels, and detect user movements for recording and determining user profiles. On the other hand, when the home is unoccupied, devices can be configured to turn off user interfaces, conserve power by altering normal levels of temperature and humidity, turn off appliances, and otherwise reduce the power usage of the home when no one is there.

Users may find it inconvenient to manually program devices according to their home and away schedules. Users may also simply forget to change settings on control devices in their homes before they leave, causing the control devices to operate in the user's absence as though they were home. Alternatively, users may simply forget to change settings on control devices when they arrive home, causing uncomfortable living conditions and general dissatisfaction with the control devices. Therefore, embodiments described herein provide methods and systems designed to enable an away-state feature that automatically changes the operating mode of a control device when it is determined that an enclosure in which the control device is installed is no longer occupied.

Some embodiments may use occupancy sensors associated with a control device to determine whether an enclosure is occupied or not. As used herein, the term "occupancy sensor" may include any sensor configured to determine whether an enclosure is physically occupied. In one embodiment, an occupancy sensor may include a Passive Infrared sensor (PIR). In another embodiment, an occupancy sensor may include a sensor configured to emit electromagnetic radiation and to receive reflections of electromagnetic radiation. In yet another embodiment, an occupancy sensor may include a near-range PIR. Other examples of occupancy sensors may include microphones, CCD cameras, magnetic switches, microwave systems, and/or the like.

An enclosure occupancy state can be continuously and automatically sensed using the occupancy sensors, the currently sensed state being classified as occupied (or "home" or "activity sensed") or unoccupied (or "away" or "inactive"). If the currently sensed occupancy state has been "inactive" for a predetermined minimum interval, termed herein an away-state confidence window (ASCW), then an away-state mode of operation can be triggered in which an actual operating setpoint is changed to a predetermined energy-saving away-state value, regardless of a setpoint value indicated by the normal control settings and/or schedule. The purpose of the away-state mode of operation is to avoid unnecessarily using energy when there are no occupants present to actually experience or enjoy the comfort of the enclosure.

When the specific control device comprises a thermostat, the away-state value may comprise a temperature, and may be set, by way of example, to a default predetermined value of 62 degrees for winter periods (or outside temperatures that would call for heating) and 84 degrees for summer periods (or outside temperatures that would call for cooling). Specific details of the away-state feature can also be found in U.S. Provisional Application No. 61/627,996 filed Oct. 21, 2011 that was previously incorporated herein by reference.

The away-state confidence window (ASCW) corresponds to a time interval of sensed non-occupancy after which a reasonably reliable operating assumption can be made, with a reasonable degree of statistical accuracy, that there are indeed no occupants in the enclosure. According to one embodiment, it has been found that a predetermined period in the range of 90-180 minutes can be a suitable period for the ASCW to accommodate for common situations such as quiet book reading, working in the yard, short naps, etc. in which there is no sensed movement or related indication for the occupancy sensors to detect.

The effectiveness of the away-state feature may in part depend upon how reliably the control unit can determine whether or not the enclosure is occupied. In one sense, this reliability may depend in part on the reliability of the occupancy sensors to detect a physical presence within a responsive area of the occupancy sensors. In another sense, this reliability may also depend in part on where the control unit has been placed in the enclosure, as well as the living patterns of the inhabitants. For example, a control unit may be placed in an area of an enclosure where is not easy for the occupancy sensors to detect whether someone is in the home or not, such as in a closet, a rarely-used hallway, a basement, or even in a high-traffic location that is obscured by other household objects. Of course, it is difficult for the control unit itself to determine whether it is located in one of these non-ideal areas of an enclosure. It may also be difficult rely on deliberate user inputs (i.e. user-entered location information) to make this determination, as users may enter this data incorrectly if at all.

Therefore, in order to efficiently and correctly use an away-state feature, a control unit may make a determination as to a level of "sensor confidence" before it relies on the occupancy sensors to enable the away-state feature. Specifically, some embodiments herein may not enable the away-state feature upon installation. Instead, these embodiments may evaluate sensor responses during a trial period in order to establish a level of sensor confidence. If the level of sensor confidence is sufficient, and exceeds a predetermined threshold, the away-state feature can be enabled. Otherwise, to avoid creating an uncomfortable environment within an occupied enclosure, the away-state feature can remain disabled until such a level of sensor confidence is established.

According to one embodiment, sensor confidence can be established by monitoring the readings from one or more occupancy sensors, and determining whether they have detected a threshold level of occupancy events. Simply, if the occupancy sensors detect a physical presence within their responsive areas during a large portion of the operating time, it can be assumed that the control unit is disposed at a location within the enclosure that can reliably detect whether the enclosure is occupied or not. In this case, a high level of sensor confidence can be assumed, such that the occupancy sensors can be relied upon to determine when the away-state feature should be activated. On the other hand, if the occupancy sensors only detect a physical presence within their responsive areas during a relatively small portion of the operating time, it can be assumed that the control unit is disposed at a location within the enclosure that cannot reliably detect whether the enclosure is occupied or not. In this case, only a low level of sensor confidence can be assumed, and thus the occupancy sensors may not necessarily be relied upon to determine when the away-state feature should be activated. In one embodiment, the away-state feature will not be enabled unless a requisite level of sensor confidence is established.

As various methods and systems for determining whether the away-state features can be enabled, it will be understood that the ensuing discussion can apply to any control unit as described above. However, throughout the remainder of this disclosure a specific type of implementation will be used, namely a thermostat. It will be understood that the principles described using thermostat hardware and software can be easily applied to other control units by one having skill in the art in light of this disclosure.

Specific to a thermostat, the away-state feature can be used to determine when a home is unoccupied, and in response, to activate an automated setpoint temperature setback mode where a predetermined setpoint temperature is set on the thermostat. For example, for an unoccupied home in the summertime, the setpoint temperature may be higher than the setpoint temperature would otherwise be in an occupied home. Likewise, for an unoccupied home in the wintertime, the setpoint temperature may be lower than the setpoint temperature would otherwise be in an occupied home. It will be understood that various permutations of these conditions may apply depending on the climate and user preferences.

Provided according to one preferred embodiment is a self-qualification algorithm by which the thermostat determines whether it can, or cannot, reliably go into an away-state mode to save energy, i.e., whether it has "sensor confidence" for its occupancy sensor measurements. For one preferred embodiment, the away-state feature is disabled for a predetermined period such as 7 days after device startup (i.e., initial installation or factory reset). On the days following startup within the predetermined time period (or another empirically predetermined suitable sample time period), the occupancy sensor activity can be tracked by discrete sequential "time buckets" of activity, such as 5-minute buckets, where a bucket is either empty (if no occupancy event is sensed in that interval) or full (if one or more occupancy events is sensed in that interval). Out of the total number of buckets for that time period, if there is greater than a predetermined threshold percentage of buckets that are full, then "sensor confidence" is established, and if there is less than that percentage of full buckets, then there is no sensor confidence established. The predetermined threshold can be empirically determined for a particular model, version, or setting of the thermostat. In one example, it has been found that 3.5% is a suitable threshold, i.e., if there are 30 or more full buckets for the three-day sample, then "sensor confidence" is established, although this will vary for different devices, models, and settings.

Figure 6A:
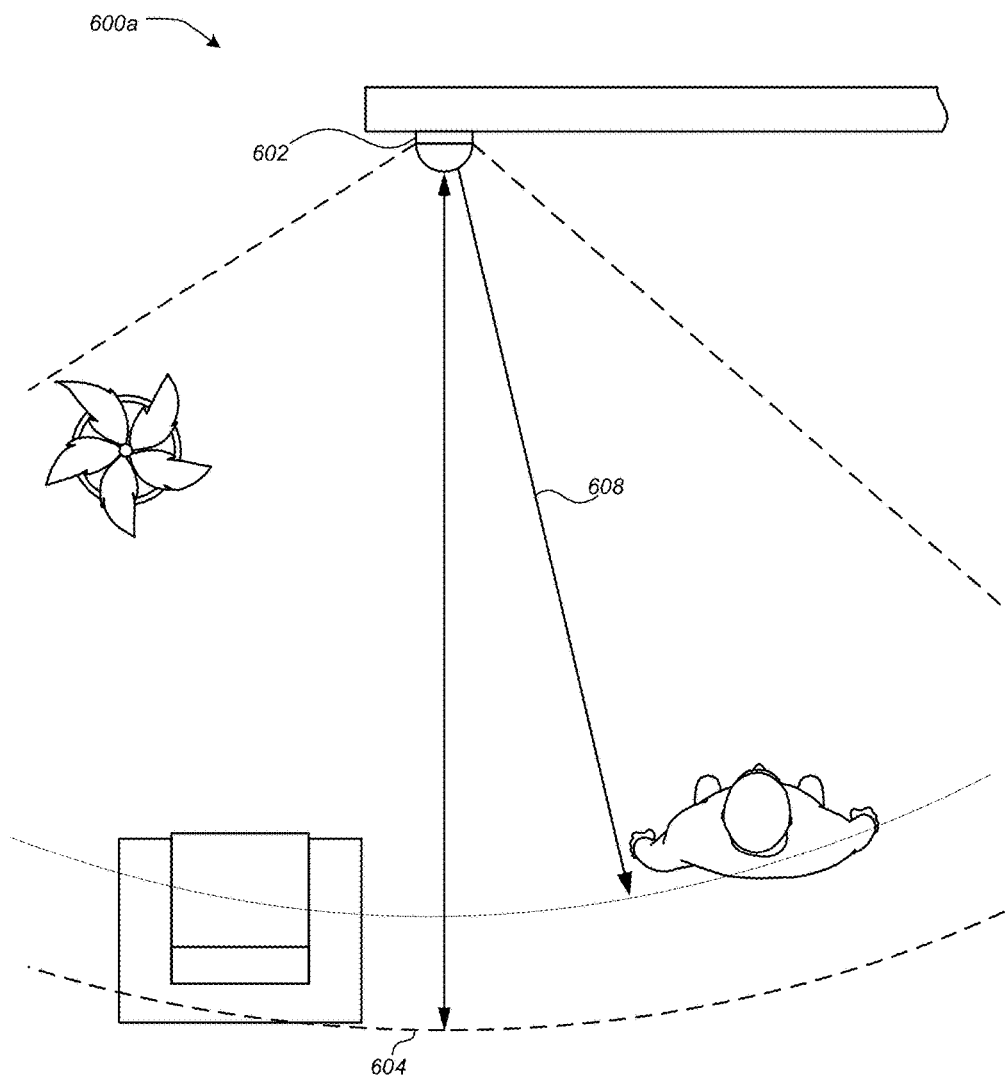
FIG. 6A illustrates an overhead view of an area monitored by a thermostat, according to one embodiment.

FIG. 6A illustrates an overhead view 600a of an area monitored by a thermostat 602, according to one embodiment. The area monitored by the thermostat 602 may comprise a room within a building, a hallway, an open living area, and/or the like. The temperature sensors of thermostat 602 may be configured to detect the ambient temperature of the area being monitored. As illustrated by FIG. 6, various sensors of the thermostat 602 may have different responsive areas. For example, an occupancy sensor may include a responsive area 604 denoted by the set of dashed lines. As used herein, the term "responsive area" may include an area in which a phenomenon that a sensor is configured to detect will generate a response by the sensor. For example, a motion detector associated with responsive area 604 could detect motion within the responsive area 604 of an object meeting the specifications of the motion detector. It should be noted that some objects may not meet the specifications of the motion detector, such as stationary objects, objects that do not emit a sufficient level of infrared radiation, or smaller objects such as pets.

Merely generating a response from a sensor may not be sufficient to infer that a physical presence is detected. The actual response generated by a sensor when an event occurs within its associated responsive area will in many cases be dependent on the intensity of the event or the distance of the event from the thermostat. For example, if an event occurs along the periphery of the associated responsive area, the response of the sensor may be small. However, if an event occurs closer to the thermostat, the response of the sensor may be larger. Therefore, some embodiments may determine a threshold for a sensor response in order to qualify as a physical presence.

Generally, a threshold can correspond to a voltage/current output, a digital readout, the frequency, or other similar electrical output of a sensor. The threshold may correspond to a certain distance, such as distance 608 for an event having a known intensity. For example, a user approaching the thermostat 602 with a PIR sensor associated with responsive area 604 could trip a threshold when coming within distance 608 of the thermostat 602. Larger persons or persons moving rapidly may trip the threshold nearer or farther than distance 608 at the same threshold. It should be noted, that in one embodiment, no threshold need be used, and any activity registered by the occupancy sensor may be sufficient to infer a physical presence.

Figure 6B:
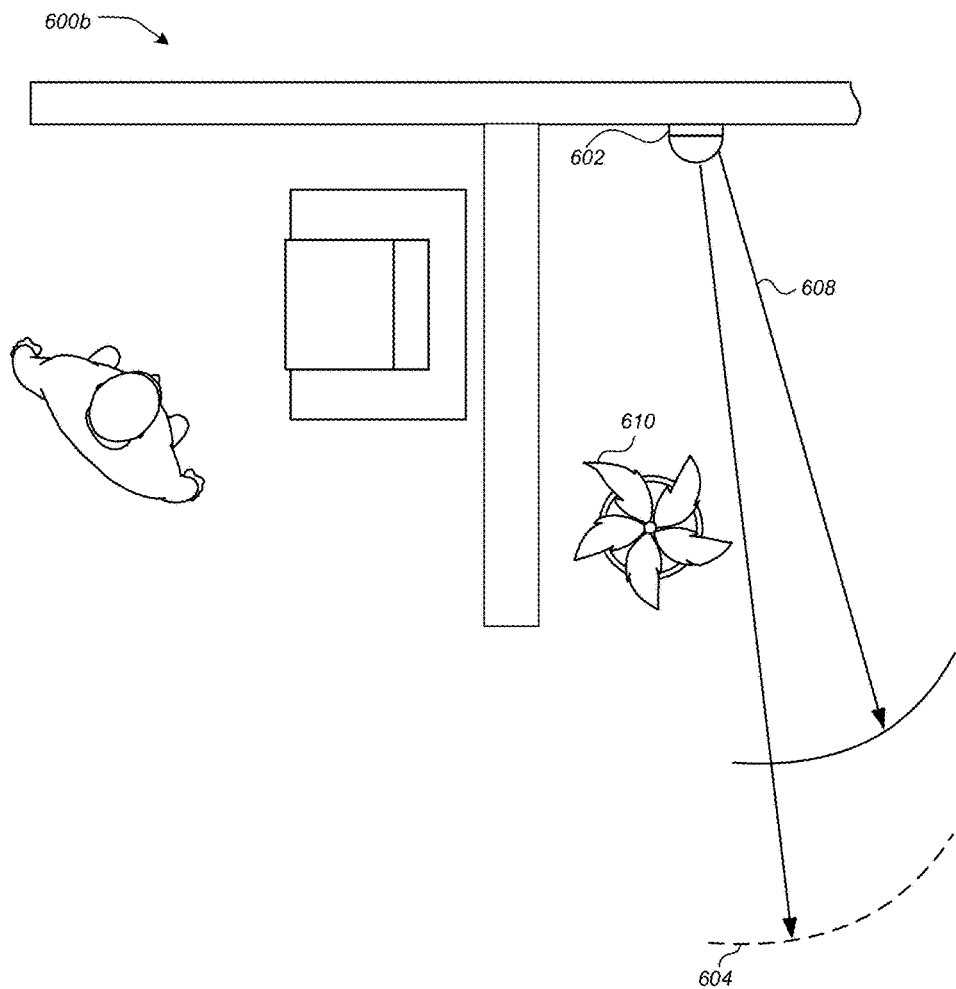
FIG. 6B illustrates an overhead view of another area monitored by a thermostat, according to one embodiment.

The overhead view 600a illustrated by FIG. 6A shows an example of a thermostat 602 that is installed in a location where a high level of sensor confidence may be established. This may correspond to a living room, a kitchen, or a busy hallway. In contrast, FIG. 6B illustrates an overhead view 600b of another area monitored by thermostat. In this embodiment, the thermostat 602 is installed in a location that may not see enough user traffic to establish a high level of user confidence. The responsive area 604 of the occupancy sensor may be targeted in a direction that will not capture the physical presence of occupants of the home very often. Additionally, obstacles, such as a plant 610 may it secure the view of the thermostat 602. Finally, the thermostat 602 may be installed in an enclosure inside the home, such as a closet or nook. Any or all of these factors may reduce the level of sensor confidence such that the away-state feature should not be enabled.

Figure 7:
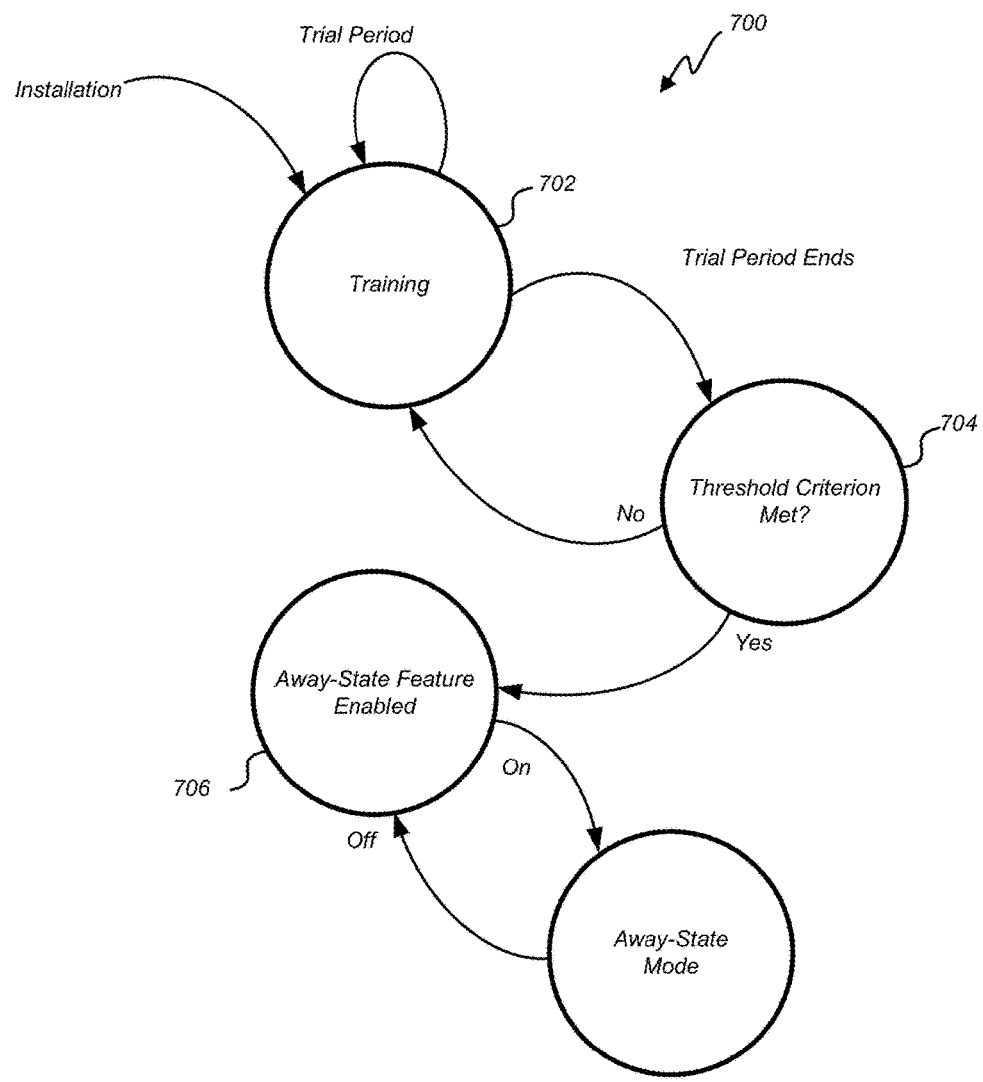
FIG. 7 illustrates a state diagram for determining whether sufficient sensor confidence can be established for enabling and away-state feature, according to one embodiment.

In order to determine whether the thermostat 602 is installed in a high-confidence location such as is shown in FIG. 6A, various evaluation methods may be used. FIG. 7 illustrates a state diagram 700 for determining whether sufficient sensor confidence can be established for enabling and away-state feature, according to one embodiment. Here, a trial period can be used to train the thermostat. During the trial period, occupancy sensor readings may be recorded and evaluated. At the end of the trial period, the occupancy sensor readings can be analyzed to determine whether a threshold criterion has been met, and if so, the away-state feature can be enabled.

The operations in state diagram 700 begin when the thermostat is installed, reset, or otherwise caused to default to a set of factory settings. At this point, the thermostat may enter into a training state 702. The thermostat may stay in the training state 702 throughout the trial period. While in the training state 702, the thermostat may record any and all measurements provided by one or more occupancy sensors. In one embodiment, the occupancy sensor measurements can be time stamped and/or recorded based on a portion of the trial period in which they occurred.

At the end of the trial period, the thermostat may enter an evaluation state 704 where it can be determined whether a threshold criterion has been met. In one embodiment, the thermostat can use the comparison to the threshold criterion to establish whether sufficiently true indications of occupancy conditions were sensed by the occupancy sensors during the trial period. In other words, the thermostat can analyze all of the occupancy sensor responses that were recorded during the trial period, and can then determine whether there were enough occupancy sensor responses to characterize the responses as true indications of occupancy. In one embodiment, too few occupancy sensor responses may indicate that the thermostat is not truly sensing the occupancy of the enclosure because it may be assumed that if placed in a better location the thermostat would receive more occupancy sensor responses. On the other hand, sufficient occupancy sensor responses may be characterized as a true indication that the thermostat can correctly determine the occupancy of the enclosure.

If the threshold criterion is met, then the thermostat can move into an enabled state 706 where the away-state feature is enabled. Afterwards, when the thermostat detects that the enclosure is no longer occupied, the thermostat may enter into and away-state mode of operation 708. This determination may be made by a processing system based on readings acquired by the occupancy sensors, and the away-state mode of operation may include an automated setback temperature setback mode. In one embodiment, the away-state feature may be enabled throughout the remaining service period of the thermostat, or until it is installed in a new location, reset, or loses power.

In another embodiment (not shown) certain conditions may exist wherein the thermostat can disable the away-state feature. For example, after the away-state feature is enabled, the thermostat can return to the training state 702 if long periods of non-occupancy are detected. After the trial period ends again, the thermostat could again determine whether the threshold criterion is met and whether the away-state feature should be disabled or continue to be enabled. In some embodiments, the training period may be re-entered and repeated in perpetuity throughout the life of the thermostat.

In one embodiment, the trial period may be repeated only a few times after installation. In some cases, users may interact with thermostat more than usual in the weeks following installation in order to make sure that it is working properly, or to fine tune the user-adjustable features. Therefore, occupancy sensor readings during the weeks immediately following installation may not be truly indicative of the real level of sensor confidence throughout the lifetime of the thermostat. In order to solve this problem, the trial period may be repeated one or more times after installation. For example, the trial period may be repeated one, two, three, four, five or, six times, and so forth, depending upon the embodiment in particular installation characteristics.

Returning now to FIG. 7, if while in the evaluation state 704 and the thermostat determines that the threshold criterion is not met or satisfied, then the thermostat may return to the training state 702 and repeat the trial period. In one embodiment, the trial period can be repeated by clearing a memory storing the occupancy sensor readings and starting over. In another embodiment, the trial period may be considered a sliding window, wherein the oldest sensor readings may be removed and replaced by newer sensor readings as they are obtained. For example, an entire day's worth of the oldest sensor readings could be removed and replaced by the current day's sensor readings. The length of the trial period may also be adjusted in this embodiment such that one week's worth of sensor measurements are evaluated at the end of each day after a least one week of sensor measurements are obtained. Of course, the trial period lasting one week is merely exemplary, and the trial period may also last one day, ten days, one month, two weeks, and so forth. If at the end of any successful trial period the threshold criterion is determined to be met, the thermostat can transition into the enabled state 706 and the away-state feature may be enabled.

Figure 8:
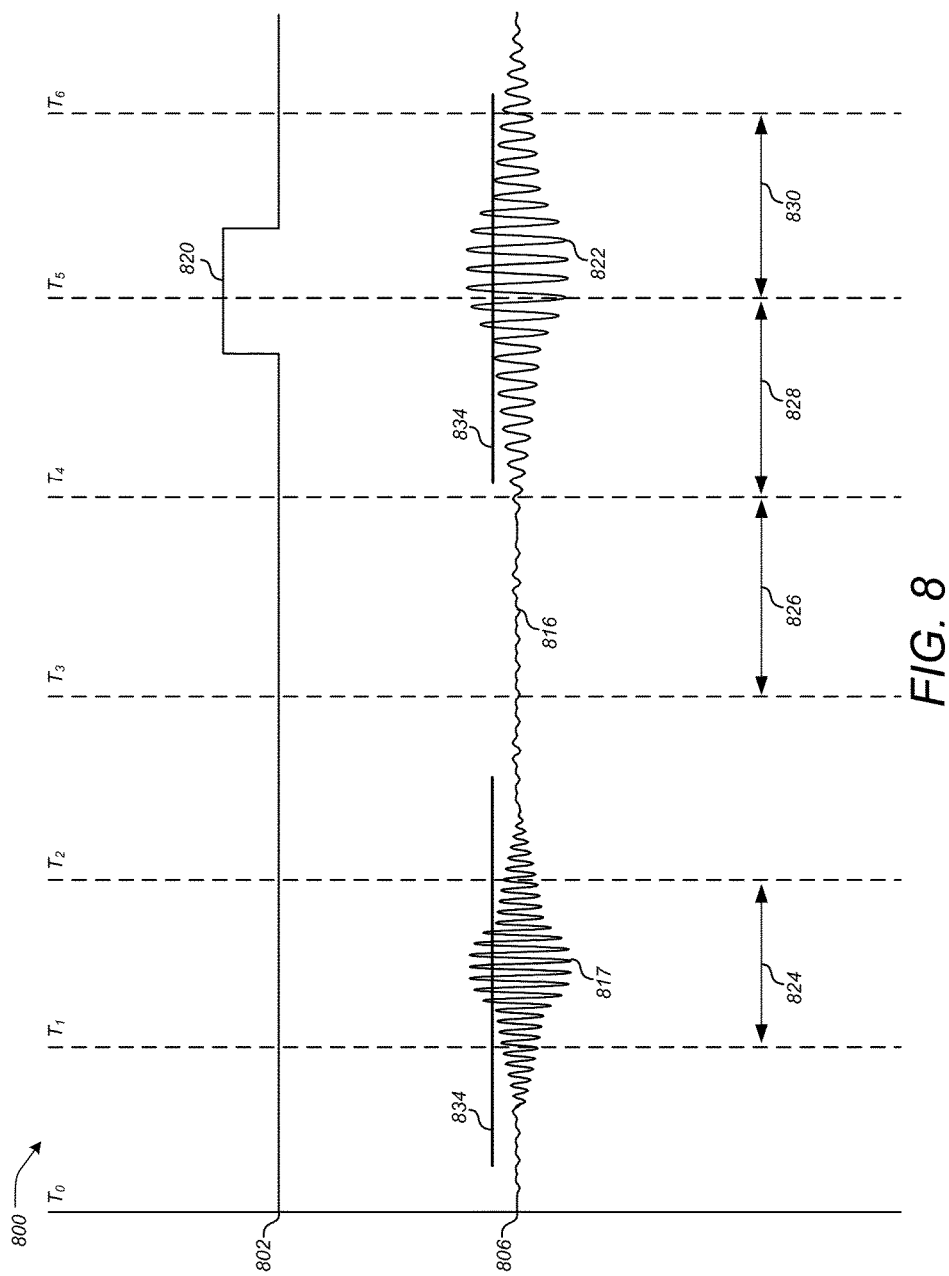
FIG. 8 illustrates a graph of various sensors responses during a trial period, according to one embodiment.

FIG. 8 illustrates a graph 800 of various sensors responses during a trial period, according to one embodiment. First, graph 800 illustrates how a trial period may be divided into a plurality of time windows, or "time buckets." Instead of storing an indication every time an occupancy sensor detects a physical presence, a single indication of whether a physical presence was detected can be stored for each time window. This may simplify calculations, reduce the amount of memory required, and/or make it easier to correlate sensor measurements with other events. For example, the timeline in FIG. 8 illustrates at least a portion of a trial period. This portion of the trial period can be divided up into various time windows, such as windows 824, 826, 828, and 830. In one embodiment, each of the time windows is approximately 5 minutes long. In other embodiments, each of the time windows can be between 3 and 7 minutes, approximately 10 minutes, 1 minute, and so forth. In some embodiments each of the time windows may have a uniform length, while in other embodiments each of the time windows may have different lengths.

FIG. 8 also illustrates a number of sensor responses. Response 806 may correspond to an occupancy sensor, such as a PIR sensor or an active proximity sensor. Response 806 illustrates a number of distinct response types that correspond to whether or not a physical presence is detected within the sensor's responsive area. Section 817 of response 806 illustrates a response characteristic of a physical presence detected within the responsive area of the occupancy sensor. Similarly, section 822 illustrates another response characteristic of a physical presence having a somewhat longer duration than the response of section 817. Section 816 of response 806 illustrates a response characteristic of an occupancy sensor that does not detect a physical presence within its responsive area.

Occupancy sensor responses indicative of a physical presence may be confined to a single time window or may span several time windows. Generally, a threshold may be used, such as threshold 834 to determine whether a sensor response is sufficient to indicate a physical presence. In one embodiment, any time window recording a sensor response that satisfies the threshold may be recorded in the time window during which occupancy was sensed. In this particular example, section 817 would record an occupancy response during time window 824. Section 822, however, would record an occupancy response during both time window 828 and time window 830.

Other sensor types may be used to determine whether a detected physical response should be used to qualify the thermostat for enabling the away-state feature. In one embodiment, it may be desirable to only record a physical presence when a user does not interact with the thermostat. The operating theory in this embodiment is that even if the thermostat is placed in a location that is unsuitable to establish sufficient sensor confidence, a number of physical presence events may still be detected when users interact with the thermostat. Some embodiments of the thermostat discussed above may include so-called "learning thermostats" that learn user behaviors such that actual interactions or minimized after an initial period of acclamation. Therefore, occupancy may need to be detected during conditions where users rarely interact with the thermostat. If the trial period for determining whether the away-state feature can be enabled takes place shortly after installation, many of the physical presence events sensed by the occupancy sensors may correspond to interactions with the thermostat before it learns user behavior, and thus may not be truly indicative of the level of sensor confidence needed to correctly determine occupancy.

To solve this problem, one embodiment may use various interaction sensors to determine when a user interacts with the thermostat. The responses of these interaction sensors can be correlated with the responses of the occupancy sensors in order to eliminate the occupancy sensor responses that coincide with interactions. Interaction sensors may include near-range PIR sensors, near-range active proximity sensors, sound sensors, light sensors, and/or the like. In a preferred embodiment, an interaction sensor includes sensors configured to detect a physical manipulation of a user interface of the thermostat. These sensors may be referred to herein as "manipulation sensors."

In FIG. 8, response 802 may represent the output of a manipulation sensor, such as an optical sensor coupled to a rotatable ring disposed around an outer perimeter of the thermostat housing. The optical sensor may provide an output whenever a rotation of the outer ring takes place, or when the user otherwise manipulates the user interface. As shown, response 802 includes section 820 representing a physical manipulation of the thermostat. Note that section 820 of response 802 coincides with section 822 of response 806 from the occupancy sensor. Therefore, section 822 of response 806 can be excluded by some embodiments from the readings recorded during the trial period. In contrast, there is no corresponding manipulation event for section 817 of response 806, and thus time window 820 may record a record physical presence event.

In some cases, manipulation events may not precisely coincide with physical presence events as detected by these two types of sensors. In one embodiment, whenever a manipulation event is detected, physical presence events may be disregarded that occurred within the same time window. In another embodiment, physical presence events may be disregarded that occurred within one, two, or three time windows of the manipulation event.

At the conclusion of the trial period, the recorded sensor responses can be analyzed. In one embodiment, the sensor response for each time window may be stored within a data structure. Generating a metric characterizing the occupancy during the time period may comprise determining the percentage of time windows during which at least one physical presence was detected compared to the number of time windows during which no physical presence was detected. From this, a percentage of occupancy may be obtained. This metric may be referred to as an "occupancy level" and may represent the percentage of time windows during which physical presences were detected.

Other more sophisticated means of computing an occupancy level may also be used. In some embodiments, it may be useful to store metrics that differentiate between weekends and weekdays. Some embodiments may also store metrics that represents physical presence events detected during the same time window during each day.

Figure 9:
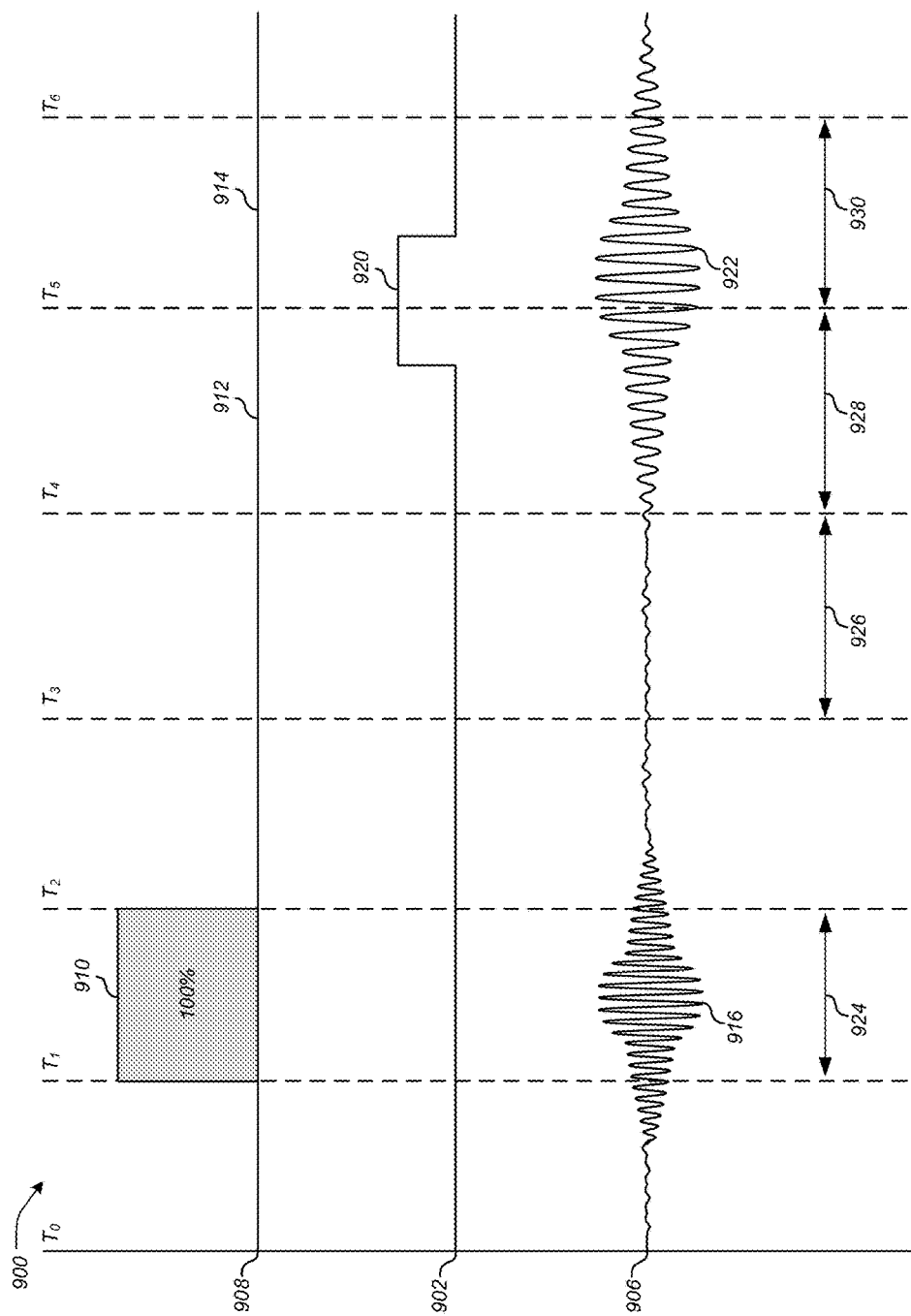
FIG. 9 illustrates a graph depicting one method of storing occupancy sensor measurements, according to one embodiment.

FIG. 9 illustrates a graph 900 depicting one method of storing occupancy sensor measurements, according to one embodiment. For convenience, response 902, response 906, as well as sections 916, 920, and 922 are similar to those shown in FIG. 8. Response 908 can represent how the various responses are stored in a data structure within a memory. In this particular embodiment, time windows 924, 926, 928, and 930 may represent time windows that occur daily. For example, time window 924 may represent 9:00 AM through 9:05 AM during each weekday. When a physical presence event is detected by the occupancy sensor, such as section 916 of response 906, the value stored in the memory location for time window 924 can be adjusted.

In this particular example, the value stored in the memory location for each time window represents the percentage of days during the time period that a physical presence event was detected during the time window. As shown by response 908, the value 910 stored for time window 924 can represent 100% if response 906 occurs in the first day of the trial period. Notice also that values 912 and 914 represent 0% because section 922 of response 906 corresponds with a manipulation event.

Figure 10:
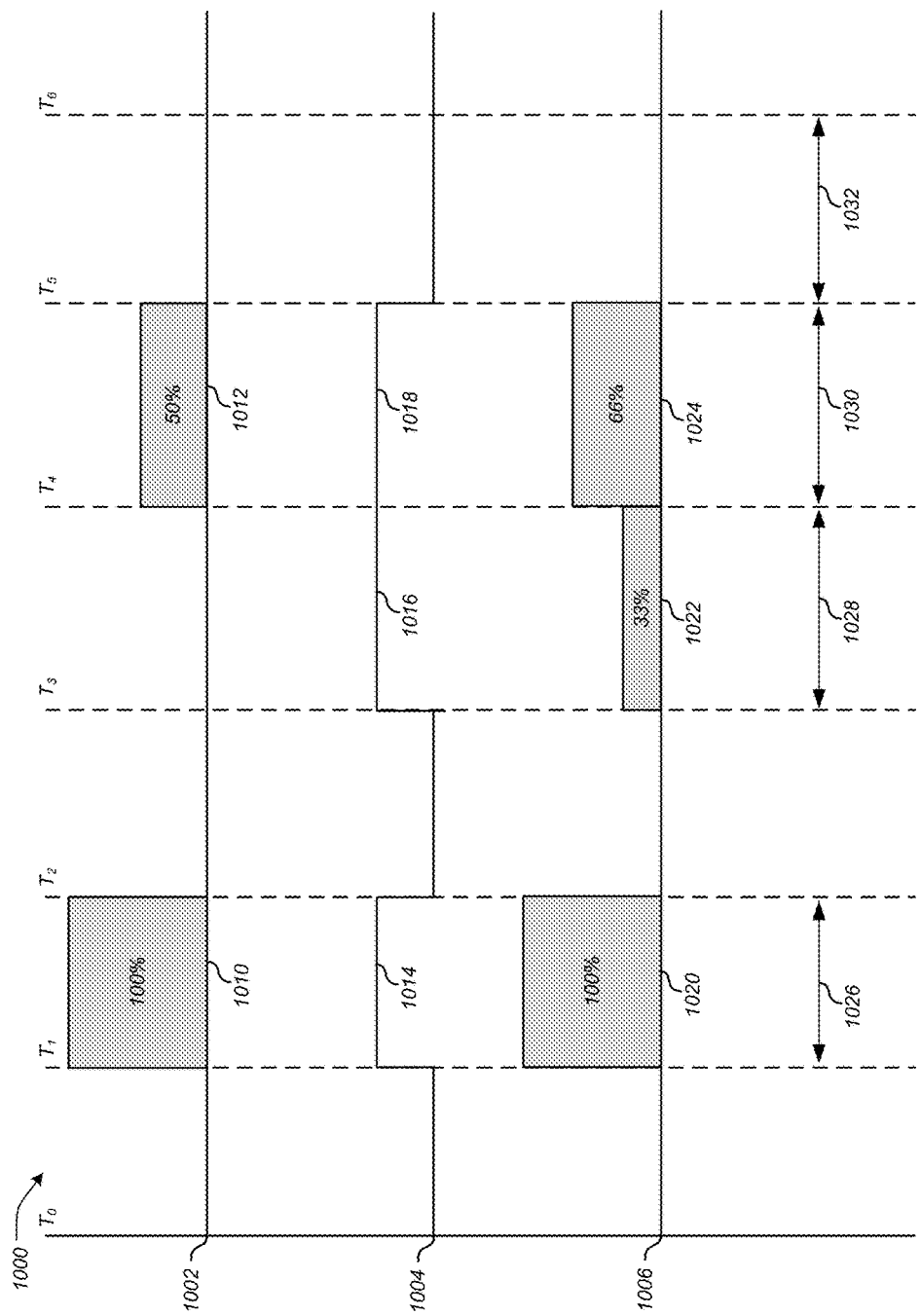
FIG. 10 illustrates a graph depicting storage of occupancy sensor measurements during the trial period.

FIG. 10 illustrates a graph 1000 depicting storage of occupancy sensor measurements during the trial period, according to one embodiment. Trace 1002 represents the value stored for each time window during the previous days of the trial period. In this example, a physical presence event occurred during time window 1026 during every previous day during the trial period. Similarly, a physical presence event occurred during time window 1030 during a proximally 50% of the previous days during the trial period. Trace 1004 represents sensor responses during a current day of the trial period. In this example, a physical presence event was detected during time windows 1014, 1016, and 1018. Note that other physical presence events may have occurred during other time windows, such as time window 1032; however these physical presence events may have been excluded because of other sensor responses, such as responses from manipulation sensors.

Trace 1006 represents the value stored for each time window after the current day's physical presence events have been recorded. In other words, trace 1006 is the result of applying trace 1004 to trace 1002. In this example, because a physical presence event 1014 was detected on the current day, the value stored for time window 1026 remains at 100%. Similarly, physical presence event 1016 was detected on the current day, and thus the value stored for time window 1028 changes from 0% to 33%. It can be inferred from this calculation that the values represented by trace 1002 represent the cumulative effects of two previous days. Therefore value 1022 of 33% represents two previous days without physical presence events combined with the physical presence event of the current day. Likewise, physical presence event 1018 can be added to the 50% value previously stored for time window 1030 to generate a new value of 66%. Time window 1032 does not show a physical presence event on the current day or on any previous days. Therefore, the value for time window 1032 remains at 0%.

According to this example, each time window may represent a bucket of time that reoccurs throughout the trial period. Although 24 hours has been used as the reoccurrence period, it will be clear in light of this disclosure that any other period could also be used. Some embodiments may store measurements according to every hour, or according to every 12 hour cycle. Other embodiments may store measurements that repeat weekly.

As discussed previously, if the trial period ends and it is determined that the threshold criterion is not met, the thermostat may again enter the training mode and begin a new trial period. When a new trial period begins, the memory locations for each time window may be reset to zero. In another embodiment, the values currently stored in the memory locations for each time window may be retained, and the percentage may continue to be adjusted over the new trial period. Other embodiments may discount the value of previously stored in the memory locations such that it is weighed less than new values acquired during the new trial period.

In embodiments where the value stored for each time window represents sensor measurements obtained during time intervals that repeat daily, it may be advantageous to treat the values for weekdays differently than weekends. It has been observed that user patterns of occupancy tend to follow a first pattern during weekdays and a second pattern during weekends when the homes are traditionally more occupied.

Figure 11:
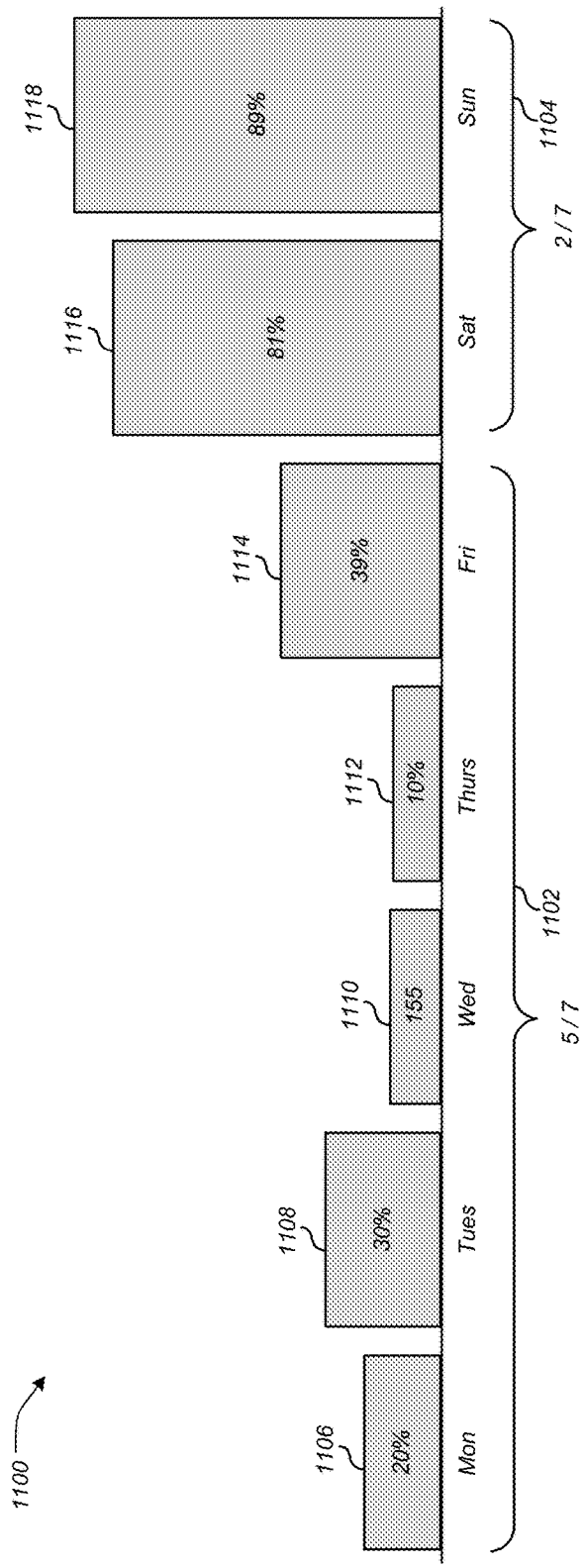
FIG. 11 illustrates a representation of occupancy levels for each day in one week, according to one embodiment.

FIG. 11 illustrates a representation of occupancy levels for each day in one week, according to one embodiment. Here, occupancy levels 1106, 1108, 1110, 1112, 1114, 1116, and 1118 have been generated for each day by combining the occupancy levels for each time window occurring for that day. This may be done by simply adding the time intervals during a day in which a physical presence was detected and comparing it to the number of time intervals during the day in which no physical presence was detected.

In order to generate a single occupancy level statistic, the occupancy levels for each day can be combined. In one embodiment, a total weekday occupancy level 1102 can be generated by combining the occupancy levels from each weekday. Similarly, a total weekend occupancy level 1104 can be generated by combining the occupancy levels from Saturday and Sunday. The weekday occupancy level 1102 can be combined with the weekend occupancy level 1104 by combining the two statistics proportionally. In one embodiment, the weekday occupancy level 1102 can be multiplied by $5/7$ and the weekend occupancy level 1104 can be multiplied by $2/7$ and added together to generate a final occupancy level.

In the embodiment illustrated by FIG. 10 where the time windows repeat daily, this process can be simplified. For example, a single data structure may be used for a single set of time windows during weekdays, and a single data structure may be used for a single set of time windows during weekends. These the weekday time windows can be combined to generate a weekday occupancy level, and the weekend time windows can be combined to generate a weekend occupancy level. The weekend occupancy level can be combined with the weekday occupancy level as described above to generate a final occupancy level.

In other embodiments (not shown) different time windows can be combined using different weights. In one embodiment, a morning occupancy level can be generated and combined with an evening occupancy level. In another embodiment, a mealtime occupancy level can be generated and combined with a non-mealtime occupancy level. These different time windows can be combined using different weights. For example, a mealtime occupancy level may be weighted more heavily than a non-mealtime occupancy level when combined. It will be understood in light of this disclosure that many other types of combinations and repeating sequences of time windows may be used.

Figure 12:
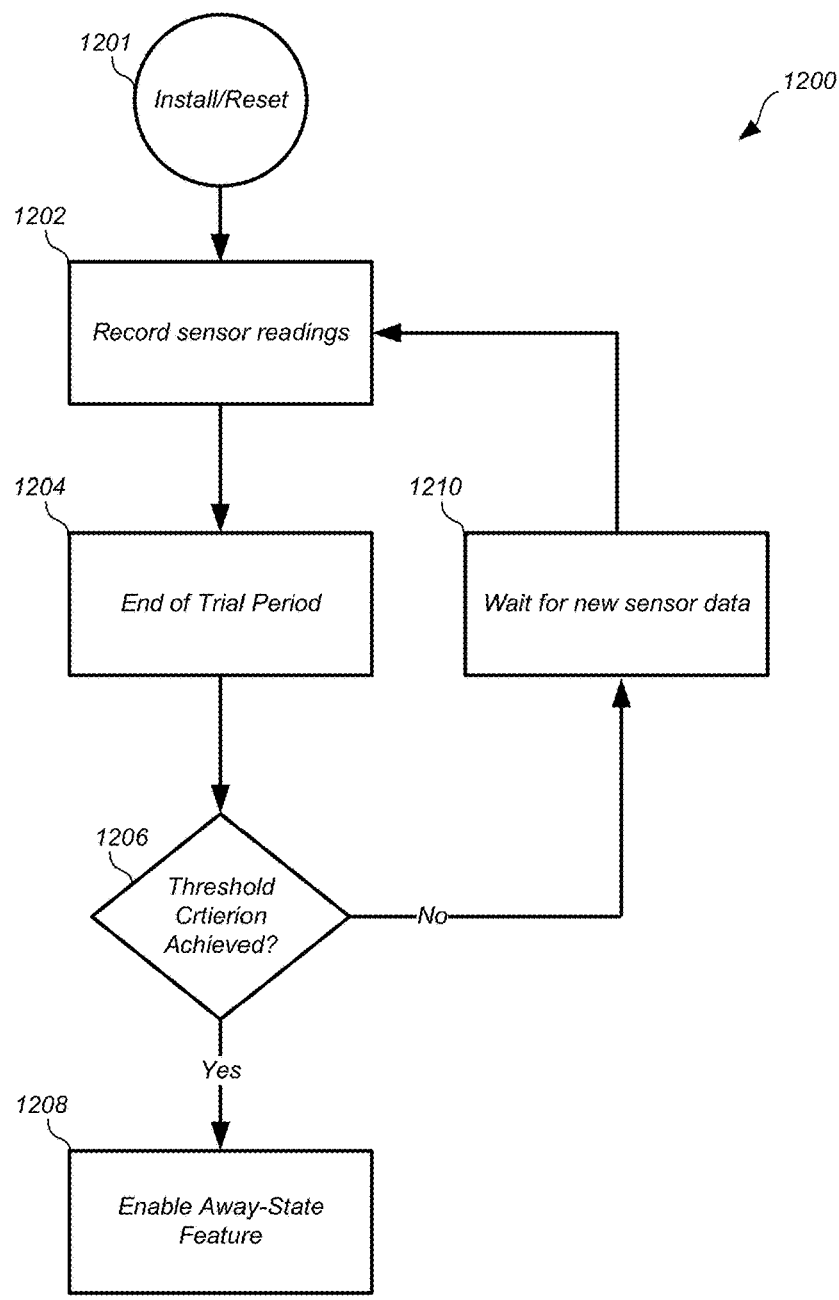
FIG. 12 illustrates a flowchart of a method for determining whether an away-state feature should be enabled, according to one embodiment.

FIG. 12 illustrates a flowchart 1200 of a method for determining whether an away-state feature should be enabled, according to one embodiment. The method may include installing or resetting the thermostat (1201). A reset may be manually initiated by a user, or may be remotely instructed by a control server. The method may also include recording sensor readings (1202). In one embodiment, the sensor readings may be from occupancy sensor(s) that are disposed within the housing of the thermostat and configured to detect physical presences of users within a responsive area of the occupancy sensor(s). The occupancy sensor may be in operative communication with a processing system. In one embodiment, the occupancy sensor(s) may comprise a PIR sensor.

A processing system may be disposed within the housing and coupled to a user interface. The processing system may be configured to be in operative communication with one or more temperature sensors for determining an ambient air temperature, and in operative communication with one or more input devices including the user interface for determining a setpoint temperature value, and in still further operative communication with a heating, ventilation, and air conditioning (HVAC) system to control the HVAC system based at least in part on a comparison of a measured ambient temperature and the setpoint temperature value.

The sensor readings may be acquired during a trial period. In one embodiment, the trial period begins upon installation and/or reset of the thermostat. The trial period may be in any interval of time, including between five and eight days, as well as one week. The acquired sensor readings may, in one embodiment, be stored according to a plurality of time windows. The trial period may be divided into the plurality of time windows, wherein each of the readings from the occupancy sensors are stored in a corresponding one of the plurality of time windows during which the reading occurs. In one embodiment, sensor readings may be excluded that also correspond with manipulation or an inferred intent to interact with or view the thermostat.

The method may also include determining the end of the trial period (1204). At the end of the trial period, an occupancy level may be computed for the trial period based on the stored sensor readings, or the stored indications of how often the occupancy sensor(s) detected physical presences of users during the trial period. In one embodiment, stored indications that correspond to a weekday can be treated differently when computing the occupancy level than a subset of the stored indications that corresponds to a weekend.

In one embodiment, the processing system may comprise a head unit processor and a backplate processor as described above. The backplate processor may receive, store, and manage the occupancy sensor(s) readings. In one embodiment, the readings may be sent to the head unit processor at the end of the trial period in order to generate an occupancy level and to determine whether the occupancy level satisfies the threshold criterion. In another embodiment, the backplate processor may perform all of these functions without waking the head unit processor.

The method may additionally include determining whether a threshold criterion is satisfied (1206). In the away-state feature, the thermostat enters into an away-state mode of operation upon a determination by the processing system based upon readings acquired by the occupancy sensor(s) that an away-stay criterion indicative of a non-occupancy condition for an enclosure in which the thermostat has been installed has been satisfied. The away-mode of operation may include an automated setpoint temperature setback mode.

In one embodiment, the threshold criterion may be designed to establish whether the thermostat is placed in a location in the enclosure where occupancy information is readily sensed by the occupancy sensor(s) of the thermostat. In one embodiment, the threshold criterion represents an occupancy level of between approximately 0.02 and 0.10. In another embodiment, the threshold criterion represents an occupancy level of approximately 0.035.

Determining whether the threshold criterion is satisfied may include comparing the occupancy level for the trial period to the threshold criterion. In another embodiment, this determination may comprise comparing information derived from the trial period readings to the threshold criterion to establish whether sufficiently true indications of occupancy conditions were sensed by the occupancy sensor(s) during the trial period.

The method may further include enabling the away-state feature of the thermostat if it is determined that the sufficiently true indications of occupancy conditions were sensed during the trial period (1208). In one embodiment, the processing system can be further configured to determine whether to activate the away-state feature after a second trial period. The second trial period may be instituted in response to a failure to satisfy the threshold criterion. In other words, the second trial period may be instituted after a determination that the sufficiently true indications of occupancy conditions were not sensed during the first trial period. If is determined that the away-state feature should not be enabled, then method may again begin recording new occupancy sensor readings during a new trial period (1210).

It will be understood that details disclosed in other sections of this disclosure may also be incorporated into the method described in relation to FIG. 12. For example, the trial period may be divided into repeating time windows and stored in memory locations that are later combined according to various methods disclosed herein to compute an occupancy level. Other similar features may be incorporated into the method above.

It should be appreciated that the specific steps illustrated in FIG. 12 provide particular methods of determining whether an away-state feature should be enabled according to various embodiments of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Thus, provided according to one or more of the embodiments is a device (which in some particularly advantageous embodiments is a thermostat), its related user interfaces, and related methods and systems that facilitate a user-friendly, enjoyable, pleasant experience during the crucial "first contact" period and equally crucial first couple of days and/or weeks thereafter in that (a) the user is not bothered with the need to decide whether to allow (activate) or to not allow (not activate) the automatic away-state functionality when they are setting up the device, while at the same time (b) the device will not trigger into the automatic away-state unless it determines itself to be "qualified" to make that decision, thereby avoiding (or substantially lessening the likelihood) of a case in which the device triggers into the auto-away state (e.g., turning down the setpoint temperature during wintertime) while the user is actually still occupying the premises. Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A control unit for controlling the operation of at least one smart-home system, comprising:
   at least one occupancy sensor; and
   a processing system configured to:
      receive readings from the at least one occupancy sensor during a time interval;
      compare information derived from the readings from the at least one occupancy sensor during the time interval to at least one threshold criterion;
      determine, based at least in part on the comparison, whether the at least one occupancy sensor reliably determined occupancy of an enclosure in which the control unit is installed during the time interval; and
      enable an away-state feature of the control unit to be operative after the time interval if it is determined that the at least one occupancy sensor reliably determined occupancy of the enclosure during the time interval.

2. The control unit of claim 1, wherein the away-state feature causes the control unit to enter into an away-state mode of operation upon a determination by the processing system based on readings acquired by the at least one occupancy sensor that an away-state criterion indicative of a non-occupancy condition for the enclosure in which the control unit has been installed has been satisfied.

3. The control unit of claim 1, wherein the control unit further comprises a housing, and wherein the processing system is disposed within the housing and coupled to a user interface, the processing system being configured to be in operative communication with one or more temperature sensors for determining an ambient air temperature, in operative communication with one or more input devices including said user interface for determining a setpoint temperature value, and in still further operative communication with a heating, ventilation, and air conditioning (HVAC) system to control the HVAC system based at least in part on a comparison of a measured ambient temperature and the setpoint temperature value.

4. The control unit of claim 1, wherein the at least one occupancy sensor comprises a Passive Infrared (PIR) sensor.

5. The control unit of claim 1, wherein the threshold criterion is used to establish whether the control unit is placed in a location in the enclosure where occupancy information is readily sensed by the at least one occupancy sensor of the control unit.

6. The control unit of claim 1, wherein the time interval begins upon installation of the control unit within the enclosure.

7. The control unit of claim 1, wherein the time interval comprises between approximately 5 and 15 days.

8. The control unit of claim 1, wherein the time interval is divided into a plurality of time windows, wherein the each of the readings from the at least one occupancy sensor are stored in a corresponding one of the plurality of time windows during which the reading occurs.

9. The control unit of claim 1, wherein the at least one smart-home system comprises an energy-consuming system, and the away-state feature comprises at least one energy-saving mode.

10. A method of qualifying an control unit for a smart-home system to activate an away-state feature, the method comprising:
receiving readings from at least one occupancy sensor during a time interval;
comparing, using a processing system of the control unit, information derived from the readings from the at least one occupancy sensor during the time interval to at least one threshold criterion;
determining, using the processing system of the control unit, and based at least in part on the comparison, whether the at least one occupancy sensors reliably determined occupancy of an enclosure in which the control unit is installed during the time interval; and
enabling, using the processing system of the control unit, an away-state feature of the control unit to be operative after the time interval if it is determined that the at least one occupancy sensor reliably determined occupancy of the enclosure during the time interval.

11. The method of claim 10, wherein the away-state feature causes the control unit to enter into an away-state mode of operation upon a determination by the processing system based on readings acquired by the at least one occupancy sensor that an away-state criterion indicative of a non-occupancy condition for the enclosure in which the control unit has been installed has been satisfied.

12. The method of claim 10, wherein the control unit further comprises a housing, and wherein the processing system is disposed within the housing and coupled to a user interface, the processing system being configured to be in operative communication with one or more temperature sensors for determining an ambient air temperature, in operative communication with one or more input devices including said user interface for determining a setpoint temperature value, and in still further operative communication with a heating, ventilation, and air conditioning (HVAC) system to control the HVAC system based at least in part on a comparison of a measured ambient temperature and the setpoint temperature value.

13. The method of claim 10, wherein the at least one occupancy sensor comprises a Passive Infrared sensor (PIR) mounted within a housing of the control unit.

14. The method of claim 10, wherein the threshold criterion is used to establish whether the control unit is placed in a location in the enclosure where occupancy information is readily sensed by the at least one occupancy sensor of the control unit.

15. The method of claim 10, wherein the time interval begins upon installation of the control unit within the enclosure.

16. The method of claim 10, wherein the time interval comprises approximately 7 days.

17. The method of claim 10, wherein the time interval is divided into a plurality of time windows, wherein the each of the readings from the at least one occupancy sensor are stored in a corresponding one of the plurality of time windows during which each reading occurs.

18. The method of claim 10, wherein the smart-home system comprises an energy-consuming system, and the away-state feature comprises at least one energy-saving mode.

* * * * *